United States Patent
Takano

(10) Patent No.: US 7,840,715 B2
(45) Date of Patent: Nov. 23, 2010

(54) APPARATUS CONNECTION INTERFACE, APPARATUS CONTROL SYSTEM AND METHOD OF CONTROLLING APPARATUS CONTROL SYSTEM

(75) Inventor: Kenji Takano, Kanagawa (JP)

(73) Assignee: Sony Corporation, Tokyo (JP)

( * ) Notice: Subject to any disclaimer, the term of this patent is extended or adjusted under 35 U.S.C. 154(b) by 931 days.

(21) Appl. No.: 11/291,408

(22) Filed: Dec. 1, 2005

(65) Prior Publication Data

US 2006/0136624 A1 Jun. 22, 2006

(30) Foreign Application Priority Data

Dec. 3, 2004 (JP) ............................ P2004-351929
Dec. 3, 2004 (JP) ............................ P2004-351930

(51) Int. Cl.
*G06F 3/00* (2006.01)
(52) U.S. Cl. ............................................ 710/2; 710/62
(58) Field of Classification Search .................. 710/62, 710/2
See application file for complete search history.

(56) References Cited

U.S. PATENT DOCUMENTS

| | | | |
|---|---|---|---|
| 5,808,702 A * | 9/1998 | Yoshinobu et al. ............ 348/731 |
| 5,862,405 A * | 1/1999 | Fukuda et al. .................. 710/9 |
| 5,942,983 A | 8/1999 | Iijima et al. |
| 6,434,323 B1 | 8/2002 | Hayashi |
| 6,570,571 B1 * | 5/2003 | Morozumi .................... 345/505 |
| 6,678,286 B1 * | 1/2004 | Fujiyama et al. ............. 370/498 |
| 6,920,508 B1 * | 7/2005 | Muller ......................... 709/251 |
| 6,944,704 B2 * | 9/2005 | Brelin .......................... 710/305 |
| 2002/0016875 A1 * | 2/2002 | Yokoyama .................... 710/62 |

FOREIGN PATENT DOCUMENTS

| | | |
|---|---|---|
| EP | 0 225 408 | 6/1987 |
| EP | 0 653 883 | 5/1995 |
| EP | 1 176 484 | 1/2002 |
| JP | 2000 151665 | 5/2000 |
| JP | 2002 44089 | 2/2002 |
| WO | WO 02 17566 | 2/2002 |

* cited by examiner

*Primary Examiner*—Henry W Tsai
*Assistant Examiner*—Elias Mamo
(74) *Attorney, Agent, or Firm*—Frommer Lawrence & Haug LLP; William S. Frommer; Thomas F. Presson

(57) ABSTRACT

An apparatus connection interface remarkably reduces the processing load of the controller. The apparatus connection interface includes a pair of connectors including a first connector and a second connector having respective signal transmission terminals for connecting a plurality of apparatus to be controlled in series to form an annular signal transmission line so as to circulate and transmit a condition confirming signal for confirming the condition of the apparatus to be controlled and, at the same time, circulate and transmit a condition notifying signal for notifying the condition of the individual apparatus to be controlled by way of the formed signal transmission line.

6 Claims, 10 Drawing Sheets

APPARATUS CONNECTION INTERFACE, APPARATUS CONTROL SYSTEM AND METHOD OF CONTROLLING APPARATUS CONTROL SYSTEM

CROSS REFERENCES TO RELATED APPLICATIONS

The present invention contains subject matter related to Japanese Patent Applications JP2004-351929 and JP2004-351930 filed in the Japanese Patent Office on Dec. 3, 2004, the entire contents of which being incorporated herein by reference.

BACKGROUND OF THE INVENTION

1. Field of the Invention

This invention relates to an apparatus connection interface, an apparatus control system and a method of controlling such an apparatus control system. The present invention can suitably be used for recording/reproduction systems adapted to record the video/audio data obtained by shooting a subject typically with a video camera and reproducing the recorded video/audio data by means of a plurality of videotape recorders.

2. Description of the Related Art

In known recording/reproduction systems, a plurality of videotape recorders is connected to a control apparatus so that the video/audio data output from a video camera are recorded in one of the videotape recorders under the control of the control apparatus and, when the recording operation of the videotape recorder comes to an end, the subsequent video/audio data output from the video camera are recorded in another one of the videotape recorder without interruption. Similarly, in the known recording/reproduction system, the video/audio data recorded in one of the videotape recorders are reproduced under the control of the control apparatus and, when the reproduction operation of the videotape recorder comes to an end, the subsequent video/audio data are reproduced from some other appropriate videotape recorder without interruption (see, inter alia, Japanese Patent Application Laid-Open Publication No. 2001-218145 (pages 3, 4, 5, 6, FIGS. 3, 5).

SUMMARY OF THE INVENTION

In a recording/reproduction system having the above-described configuration, the control apparatus is required to control the plurality of videotape recorders of the system, constantly monitoring the operating conditions of the videotape recorders. Therefore, the processing load of the control apparatus is enormous in such a recording/reproduction system that includes a plurality of videotape recorders and hence it is highly difficult to build such a system without problems.

In view of the above identified problems, it is therefore the object of the present invention to provide an apparatus connection interface that can remarkably reduce the processing load of the controller, an apparatus control system that can be built without difficulty and a method of controlling such an apparatus control system.

According to the present invention, the above object is achieved by providing an apparatus connection interface including: a pair of connectors including a first connector and a second connector having respective signal transmission terminals for connecting a plurality of apparatus to be controlled in series to form an annular signal transmission line so as to circulate and transmit a condition confirming signal for confirming the condition of the apparatus to be controlled and, at the same time, circulate and transmits a condition notifying signal for notifying the condition of the individual apparatus to be controlled by way of the formed signal transmission line.

Thus, according to the present invention, while the plurality of apparatus to be controlled is adapted to receive a control signal from the controller, it is possible to cause them to execute respective processes consistently with the condition of the apparatus, while causing them to mutually confirming the condition. Therefore, when a plurality of apparatus to be controlled are connected in series, it is possible to prevent in advance the processing load from remarkably increasing by causing the controller to constantly confirm the condition of the apparatus to be controlled and transmit a control signal to them at right timing.

Thus, it is possible to realize an apparatus connection interface that can remarkably reduce the processing load of the controller.

According to the present invention, there is provided with an apparatus control system and a method of controlling an apparatus control system; the control system having a plurality of apparatus to be controlled and a plurality of apparatus connection interfaces, each having a pair of connectors including a first connector and a second connector having respective signal transmission terminals, and each used for connecting the plurality of apparatus to be controlled in series; the method including: a step of forming an annular signal transmission line by means of the signal transmission terminals of the first and second connectors at the time of connecting the plurality of apparatus to be controlled by way of the plurality of apparatus connection interfaces; a step of circulating and transmitting a condition confirming signal for confirming the condition of the apparatus to be controlled by way of the formed signal transmission line; and a step of circulating and transmitting a condition notifying signal for notifying the condition of the individual apparatus to be controlled.

Thus, according to the present invention, the controller is not required to transmit a control signal at right timing, while constantly confirming the condition of the apparatus to be controlled. In other words, it is only necessary for the controller to simply transmit a control signal so that the apparatus to be controlled may confirm the condition of the other apparatus to be controlled and execute a process according to the control signal consistently with the confirmed condition.

Then, when a plurality of apparatus to be controlled are used to build a system, it is possible to prevent in advance the processing load of the controller from remarkably increasing by causing the controller to constantly confirm the condition of the apparatus to be controlled and transmit a control signal to them at right timing at the time of controlling the apparatus to be controlled. Therefore, a system can be built without difficulty even when a plurality of apparatus to be controlled is used.

The nature, principle utility of the invention will become more apparent from the following detailed description when read in conjunction with the accompanying drawings in which like parts are designated by like reference numerals or characters.

DETAILED DESCRIPTION OF THE PREFERRED EMBODIMENT

Now, the present invention will be described in greater detail by referring to the accompanying drawings that illustrate a preferred embodiment of the invention.

Figure 1:
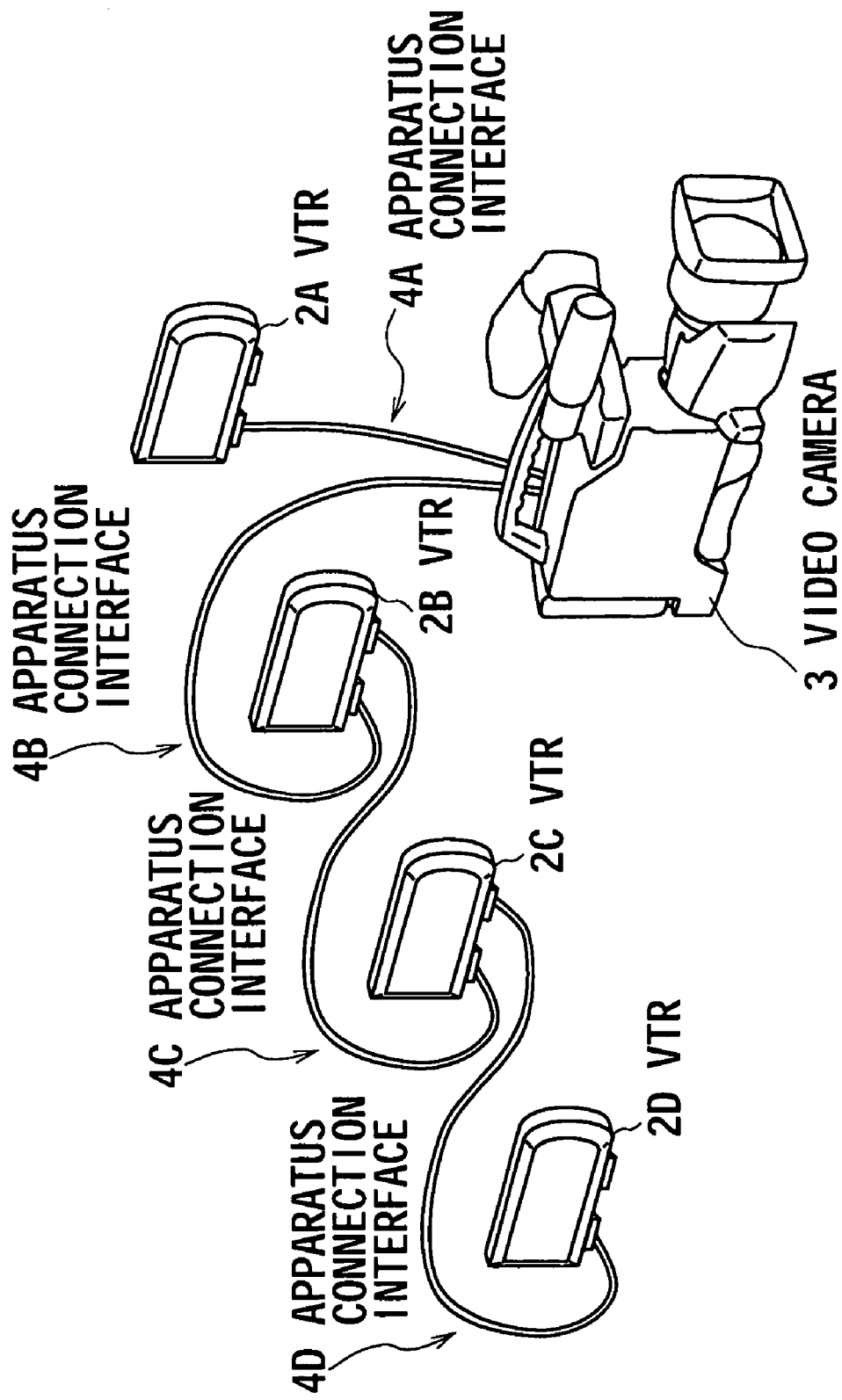
FIG. 1 is a schematic perspective view of an embodiment of recording/reproduction system realized according to the present invention, showing the entire configuration of the system.

FIG. 1 generally illustrates a recording/reproduction system realized according to the present invention. Referring to FIG. 1, the recording/reproduction system is built by connecting a plurality of videotape recorders 2A through 2D and a single video camera in series sequentially by way of apparatus connection interfaces 4A through 4D. The videotape recorders 2A through 2D have a same configuration and each of them is provided with a pair of a male type connector and a female type connector. The video camera 3 is also provided with a pair of a male type connector and a female type connector that are similar to the male type connectors and the female type connectors of the video tape recorders 2A through 2D.

The first videotape recorder 2A is connected to the video camera 3 by way of the apparatus connection interface 4A that includes a connector, which may typically be male type connector, arranged at the videotape recorder 2A (to be referred to as first connector hereinafter), a matching connector, which may typically be a female type connector, arranged at the video camera 3 (to be referred to as second connector hereinafter) and a single connector cable, the first and second connectors being arranged at the opposite ends thereof. Note that pairs of corresponding terminals are arranged in the first and second connectors and connected by respective transmission lines that are housed in the single cable so that the terminals of each pair arranged respectively in the first and second connectors can communicate with each other by way of a transmission line. The video camera 3 is connected to the second videotape recorder 2B by way of another apparatus connection interface 4B that includes a first connector arranged at the video camera 3, a matching second connector arranged at the second videotape recorder 2B and a connector cable. Similarly, the second videotape recorder 2B and the third videotape recorder 2C are connected to each other by way of an apparatus connection interface 4C that includes a first connector, a second matching connector and a connector cable and the third videotape recorder 2C and fourth videotape recorder 2D are connected to each other by way of an apparatus connection interface 4D that includes a first connector, a second matching connector and a connector cable.

Note that the video camera 3 can be connected directly to the first videotape recorder 2A by way of their respective first and second connectors, using only the first and second connectors as apparatus connection interface. Alternatively, the video camera 3 can be connected directly to a camera adaptor (not shown) that is provided with first and second connectors through their respective first and second connectors that match each other. Such a camera adaptor can be connected to a microphone. Therefore, when a camera adaptor is connected to it, the video camera 3 can take in the audio data obtained by collecting surrounding sounds by means of a microphone 5 by way of the camera adaptor. Additionally, each of the videotape recorders 2A through 2D can be connected directly to a video adaptor (not shown) that is provided with first and second connectors through their respective first and second connectors that match each other. Such a video adaptor is provided with input/output terminals including data output terminals for outputting video data and audio data respectively to a monitor and a speaker and data input terminals for inputting video data and audio data supplied from some other reproduction apparatus. Therefore, when a video adaptor is connected to any of the videotape recorders 2A through 2D, the videotape recorder can output video data and audio data respectively to a monitor and a speaker by way of the video adaptor and take in video data and audio data supplied from some other reproduction apparatus.

Such a camera adaptor can also be connected to any of the videotape recorders 2A through 2D (or a video adaptor) by way of an apparatus connection interface including a first connector, a matching second connector and a connector cable (or only a first connector and a matching second connector), the first and second connectors being identical with their counterparts of the videotape recorders 2A through 2D (or the video adaptor), while it is connected to the video camera 3 by way of the first or second connector thereof. Additionally, while the camera adaptor is connected to any of the videotape recorders 2A through 2D by way of the first or second connector thereof, it can also be connected to any of the remaining videotape recorders 2A through 2D or the video camera 3 by way of an apparatus connection interface including a first connector, a matching second connector and a connector cable (or only a first connector and a matching second connector), the first and second connectors being identical with their counterparts of the videotape recorders 2A through 2D and the video camera 3. Furthermore, while any of the videotape recorders 2A through 2D is connected to the video adaptor by way of the first or second connector thereof, it can also be connected to some other video adaptor, any of the remaining videotape recorders 2A through 2D or the video camera 3 by way of an apparatus connection interface including a first connector, a matching second connector and a connector cable (or only a first connector and a matching second connector), the first and second connectors being identical with their counterparts of the other video adaptor, the videotape recorders 2A through 2D and the video camera 3.

Figure 2:
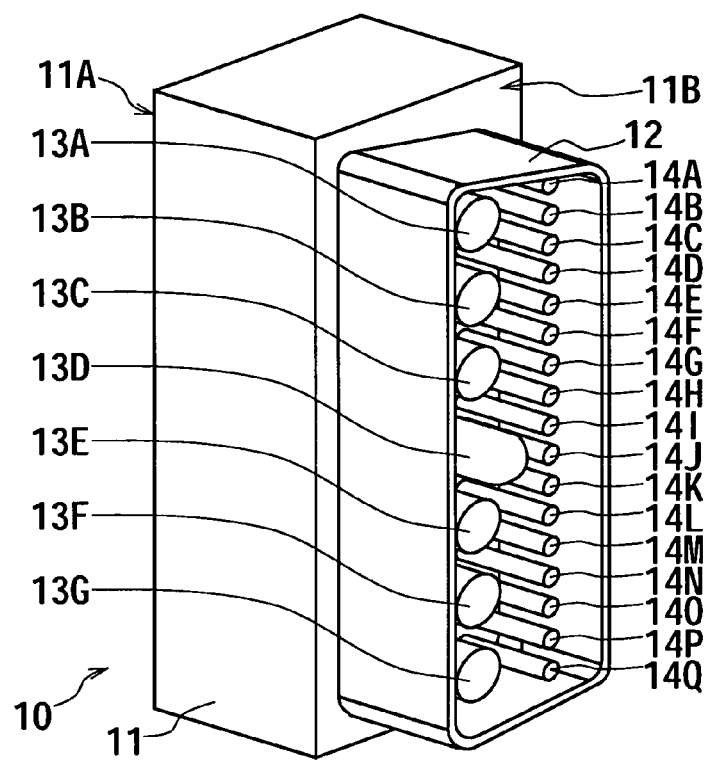
FIG. 2 is a schematic perspective view of the first connector of an apparatus connection interface according to the present invention, showing the configuration thereof.
Figure 3:
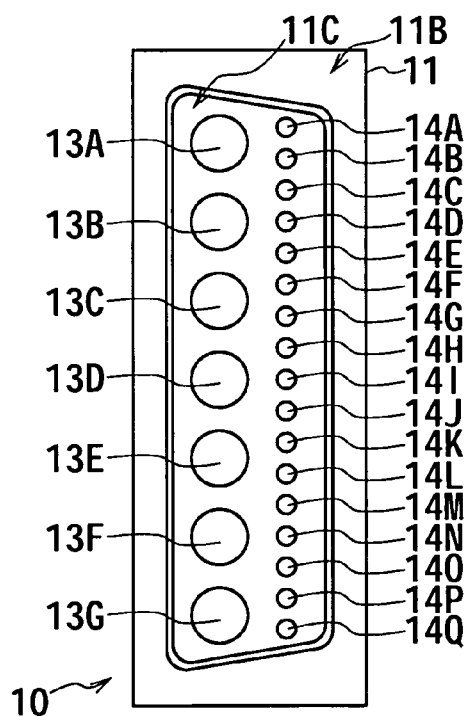
FIG. 3 is a schematic diagram of the terminals of the first connector of the apparatus connection interface of FIG. 2, showing the positional arrangement thereof.

Meanwhile, as shown in FIGS. 2 and 3, the first connector 10 includes a substantially rectangularly parallelepipedic connector main body section 11. The connector main body section 11 is fitted to the cabinet of any of the videotape recorders 2A through 2D or the video camera 3 or one of the opposite ends of a connector cable at a broad lateral surface 11A thereof. The connector main body section 11 has a sleeve-like connector connection guide plate 12 formed by bending a plate-shaped member and projecting from the opposite broad lateral surface 11B thereof. A substantially trapezoidal part (to be referred to as terminal arrangement surface hereinafter) 11C is formed on the lateral surface 11B of the connector main body 11 and surrounded by the connector connection guide plate 12. A total of seven first terminals 13A through 13G, which are relatively large electro-conductive pins having a predetermined diameter, are arranged in a row along the bottom side of the trapezoid so as to stand up from the terminal arrangement surface 11B and run in parallel with the longitudinal direction of the terminal arrangement surface (to be referred to as arrangement surface longitudinal direction hereinafter) of the terminal arrangement surface 11B. Additionally, a total of seventeen second terminals 14A through 14Q, which are electro-conductive pins having a diameter smaller than the diameter of the first terminals 13A through 13G, are arranged in a row along the top side of the trapezoid so as to stand up from the terminal arrangement surface 11C and run in parallel with the arrangement surface longitudinal direction.

Figure 4:
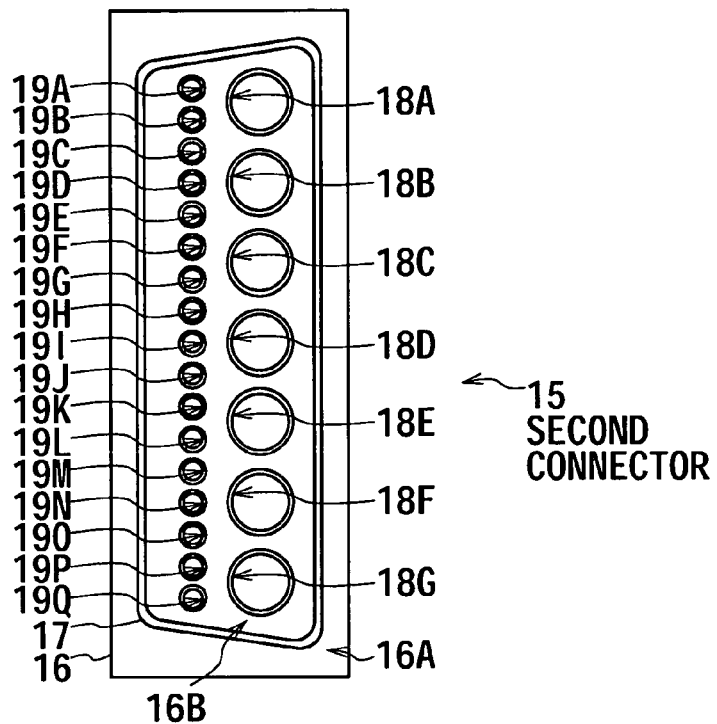
FIG. 4 is a schematic diagram of the terminals of the second connector of the apparatus connection interface of FIG. 2, showing the positional arrangement thereof.

On the other hand, as shown in FIG. 4, the second connector 15 includes a substantially rectangularly parallelepipedic connector main body section 16, although not particularly illustrated. The connector main body section 16 is fitted to the cabinet of any of the videotape recorders 2A through 2D or the video camera 3 or the other end of a connector cable at a broad lateral surface thereof. The connector main body section 16 has a sleeve-like connector connection guide plate 17 projecting from the opposite broad lateral surface 16A thereof and adapted to be engaged with the connector connection guide plate 12 of the first connector 10. The second connector 15 is provided on the substantially trapezoidal terminal arrangement surface 16B arranged on the lateral surface 16A and surrounded by the connector connection guide plate 17 with third and fourth terminals 18A through 18G and 19A through 19Q that are bored electro-conductive insertion holes respectively matching the first terminals 13A through 13G and the second terminals 14A through 14Q arranged in the first connector 10.

Of the second and fourth terminals 14A through 14Q and 19A through 19Q in the first and second connectors 10 and 15 that are arranged in rows, typically the three second terminals 14H through 14J arranged at the middle and the corresponding three fourth terminals 19H through 19J are fixedly assigned to operate as feed terminals for power supply. Therefore, each of the videotape recorder 2A through 2D and the video camera 3 can be powered to operate not only by the battery arranged in itself or by an external commercial power source but also by a video adaptor, for instance, by way of the feed terminals of the first and second connectors 10 and 15 (the second terminals 14H through 14J and the fourth terminals 19H through 19J).

Figure 5:
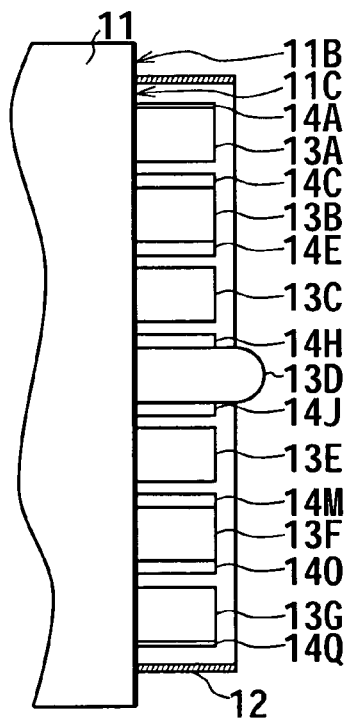
FIG. 5 is a schematic diagram of the grounding terminals of the first connector.

Additionally, as shown in FIG. 5, of the first and third terminals 13A through 13G and 18A through 18G in the first and second connectors 10 and 15 that are arranged in rows, typically the first terminal 13D arranged at the middle and the corresponding third terminal 18D also arranged at the middle are fixedly assigned to operate as grounding terminals. Note that the length of the first terminal 13D that is assigned to operate as grounding terminal is greater than the lengths of the other first terminals 13A through 13C and 13E through 13G. Therefore, when one of the videotape recorders 2A through 2D or the video camera 3 (or a video adaptor or a camera adaptor) is to be connected to another one of the videotape recorders 2A through 2D or the video camera 3 (or a video adaptor or a camera adaptor) by way of an apparatus connection interface 4A, 4B, 4C or 4D, firstly the grounding terminals (including the first terminal 13D and the third terminal 18D) are commonly grounded and then power is supplied to them by way of the feed terminals (including the second terminals 14H through 14J and the fourth terminals 19H through 19J). In this way, the videotape recorders 2A through 2D and the video camera 3 (and the video adaptor and the camera adaptor) are prevented in advance from falling into trouble when an electric current flows above a predetermined limit level in a circuit inside of the apparatus connected to it, which is some other one of the videotape recorders 2A through 2D and the video camera 3 (or the video adaptor and the camera adaptor).

Furthermore, the first and third terminals 13A through 13G and 18A through 18G in the first and second connectors 10 and 15 other than the grounding terminals, or the first and third terminals 13A through 13C, 13E through 13G, 18A through 18C and 18E through 18G are assigned to operate as data transmission/reception terminals for transmission/reception of video/audio data conforming to the High Definition Serial Digital Interface (HD-SDI) Standard. Of the first terminals 13A through 13C and 13E through 13G of the first connector 10 that are assigned to operate as data transmission/reception terminals, four first terminals including the first, second, sixth and seventh terminals 13A, 13B, 13F and 13G as counted from one of the opposite ends thereof are assigned to operate as data transmission/reception terminals (to be referred to as first direction data transmission terminals hereinafter) for transmitting video/audio data in the direction for transmitting video/audio data from the video camera 3 to the videotape recorder 2A, 2B, 2C or 2D (to be referred to as first direction hereinafter). Similarly, of the third terminals 18A through 18C and 18E through 18G of the second connector 15 that are assigned to operate as data transmission/reception terminals, four third terminals 18A, 18B, 18F and 18G that correspond to the first direction data transmission terminals of the first connector 10 (or four third terminals including the first, second, sixth and seventh terminals 18A, 18B, 18F and 18G as counted from one of the opposite ends) are assigned to operate as first direction data transmission terminals.

On the other hand, of the first terminals 13A through 13C and 13E through 13G of the first connector 10 that are assigned to operate as data transmission/reception terminals, the two first terminals 13C and 13E that are located next to the first terminal 13D assigned to operate as grounding terminal are assigned to operate as data transmission/reception terminals (to be referred to as second direction data transmission terminals hereinafter) for transmitting video/audio data in the direction for transmitting video/audio data from the videotape recorder 2A, 2B, 2C or 2D, whichever appropriate, to the video camera 3 (to be referred to as second direction hereinafter). Similarly, of the third terminals 18A through 18C and 18E through 18G of the second connector 15 that are assigned to operate as data transmission/reception terminals, the third terminals 18C and 18E that correspond to the second direction data transmission terminals of the first connector 10 (or the third terminals 18C and 18E that are located next to the third terminal 18D assigned to operate as grounding terminal) are assigned to operate as second direction data transmission terminals.

Then, when one of the videotape recorders 2A through 2D or the video camera 3 (or a video adaptor or a camera adaptor) is connected to another one of the videotape recorders 2A through 2D or the video camera 3 (or a video adaptor or a camera adaptor) by way of an apparatus connection interface 4A, 4B, 4C or 4D, it can transmit video/audio data of any of various different formats in the first direction by selectively using all, three or two of the four first direction data transmission terminals (or the first terminals 13A, 13B, 13F and 13G and the third terminals 18A, 18B, 18F and 18G). More specifically, when the one of the videotape recorders 2A through 2D or the video camera 3 (or a video adaptor or a camera adaptor) uses all the four first direction data transmission terminals, it can transmit the odd data of 4:4:4 60P format video/audio data with corresponding audio data in the first direction typically by way of two of the four first direction data transmission terminals and the even data of the video/audio data with corresponding audio data in the first direction by way of the remaining two first direction data transmission terminals. Alternatively, the one of the videotape recorders 2A through 2D or the video camera 3 (or a video adaptor or a camera adaptor) can transmit the odd data of video/audio data of a format with a reduced number of frames per second if compared with the 4:4:4 60P format with corresponding audio data in the first direction typically by way of two of the four first direction data transmission terminals and the even data of the video/audio data with corresponding audio data in the first direction by way of the remaining two first direction data transmission terminals.

Furthermore, the videotape recorders 2A through 2D and the video camera 3 (or a video adaptor and a camera adaptor) can also transmit 4:4:4 format video/audio data in the first direction typically by way of two of the four first direction data transmission terminals and other 4:4:4 format video/audio data in the first direction by way of the remaining two first direction data transmission terminals. Alternatively, the videotape recorders 2A through 2D and the video camera 3 (or a video adaptor and a camera adaptor) can also transmit 4:4:4 format video/audio data in the first direction typically by way of two of the four first direction data transmission terminals and 4:2:2 format video/audio data of two different types in the first direction respectively by way of the remaining two first direction data transmission terminals. Finally, the videotape recorders 2A through 2D and the video camera 3 (or a video adaptor and a camera adaptor) can also transmit 4:2:2 format video/audio data of four different types in the first direction respectively by way of the four first direction data transmission terminals.

When any of the videotape recorders 2A through 2D or the video camera 3 (or a video adaptor or a camera adaptor) uses three out of the four first direction data transmission terminals, it can transmit 4:4:4 format video/audio data in the first direction typically by way of two of the four first direction data transmission terminals and 4:2:2 format video/audio data in the first direction by way of the remaining first direction data transmission terminal.

When any of the videotape recorders 2A through 2D or the video camera 3 (or a video adaptor or a camera adaptor) uses two out of the four first direction data transmission terminals, it can transmit 4:4:4 format video/audio data in the first direction by way of the two first direction data transmission terminals. Alternatively, the videotape recorders 2A through 2D and the video camera 3 (or a video adaptor and a camera adaptor) can transmit the odd data of 4:2:2 60P format video/audio data with corresponding audio data in the first direction by way of one of the two first direction data transmission terminals and the even data of the video/audio data with corresponding audio data in the first direction by way of the other first direction data transmission terminal. Still alternatively, the videotape recorders 2A through 2D and the video camera 3 (or a video adaptor and a camera adaptor) can transmit 4:2:2 format video/audio data of two different types in the first direction respectively by way of the two first direction data transmission terminals.

When one of the videotape recorders 2A through 2D or the video camera 3 (or a video adaptor or a camera adaptor) is connected to another one of the videotape recorders 2A through 2D or the video camera 3 (or a video adaptor or a camera adaptor) by way of an apparatus connection interface 4A, 4B, 4C or 4D, it can transmit 4:4:4 format video/audio data in the second direction by way of the two second direction data transmission terminals. Alternatively, the videotape recorders 2A through 2D and the video camera 3 (or a video adaptor and a camera adaptor) can transmit the odd data of 4:2:2 60P format video/audio data with corresponding A/D data in the second direction by way of one of the two second direction data transmission terminals and the even data of the video/audio data with corresponding audio data in the second direction by way of the other second direction data transmission terminal. Still alternatively, the videotape recorders 2A through 2D and the video camera 3 (or a video adaptor and a camera adaptor) can transmit 4:2:2 format video/audio data of two different types in the second direction by way of the two second direction data transmission terminals.

Meanwhile, of the second and fourth terminals 14A through 14Q and 19A through 19Q arranged in rows of the first and second connectors 10 and 15, the two second terminals 14A and 14B and the corresponding two fourth terminals 19A and 19B that are the first and second terminals as counted from one of the opposite ends thereof are fixedly assigned to operate as first one direction signal transmission terminals for transmitting various signals including control signals in one direction (to be referred to as connection one direction) from the connection starting extremity, which is one of the videotape recorders 2A through 2D or the video camera 3 (e.g., videotape recorder 2A) connected in series, to the connection terminating extremity, which is the other apparatus (e.g., videotape recorder 2D) connected in series, by way of a pair of balanced transmission paths. On the other hand, of the second and fourth terminals 14A through 14Q and 19A through 19Q apparatus in rows of the first and second connectors 10 and 15, the two second terminals 14C and 14D and the corresponding two fourth terminals 19C and 19D that are the third and fourth terminals as counted from one of the opposite ends thereof are fixedly assigned to operate as first other direction signal transmission terminals for transmitting various signals including control signals in the other direction (to be referred to as connection other direction) from the connection terminating extremity, which is one of the videotape recorders 2A through 2D or the video camera 3 connected in series other than the connection starting extremity, to the connection starting extremity by way of a pair of balanced transmission paths.

Additionally, of the second and fourth terminals 14A through 14Q and 19A through 19Q arranged in rows of the first and second connectors 10 and 15, the two second terminals 14P and 14Q and the corresponding two fourth terminals 19P and 19Q that are the sixteenth and seventeenth terminals as counted from one of the opposite ends thereof are fixedly assigned to operate as second one direction signal transmission terminals for transmitting various signals including control signals in the connection one direction by way of a pair of balanced transmission paths. Still additionally, of the second and fourth terminals 14A through 14Q and 19A through 19Q arranged in rows of the first and second connectors 10 and 15, the two second terminals 14N and 14O and the corresponding two fourth terminals 19N and 19O that are the fourteenth and fifteenth terminals as counted from one of the opposite ends thereof are fixedly assigned to operate as second other direction signal transmission terminals for transmitting various signals including control signals in the connection other direction by way of a pair of balanced transmission paths.

Furthermore, of the second and fourth terminals 14A through 14Q and 19A through 19Q arranged in rows of the first and second connectors 10 and 15, the second terminal 14E and the corresponding fourth terminals 19E that are the fifth terminals as counted from one of the opposite ends thereof are fixedly assigned to operate as synchronizing signal transmission terminals for transmitting and receiving synchronizing signals of video data of 30 frames per second. Additionally, of the second and fourth terminals 14A through 14Q and 19A through 19Q arranged in rows of the first and second connectors 10 and 15, the second terminal 14F and the corresponding fourth terminals 19F that are the sixth terminals as counted from one of the opposite ends thereof are fixedly assigned to operate as spare transmission/reception terminals that can be used as terminals for transmitting/receiving other various signals.

Still additionally, of the second and fourth terminals 14A through 14Q and 19A through 19Q arranged in rows of the first and second connectors 10 and 15, the second terminal 14G and the corresponding fourth terminals 19G that are the seventh terminals as counted from one of the opposite ends thereof are fixedly assigned to operate as apparatus identifying terminals for identifying the connection partners connected to them respectively. The videotape recorders 2A through 2D and the video camera 3 (or a video adaptor and a camera adaptor) generates in the inside thereof respective voltage signals of predetermined voltage levels for identifying themselves. Therefore, when one of the videotape recorders 2A through 2D or the video camera 3 (or a video adaptor or a camera adaptor) is connected to another one of the videotape recorders 2A through 2D or the video camera 3 (or a video adaptor or a camera adaptor) by way of an apparatus connection interface 4A, 4B, 4C or 4D, it takes in the voltage signal generated in the inside of the connection partner by way of the apparatus identifying terminal (which is the second terminal 14G or the fourth terminal 19G). As a result, the videotape recorder 2A, 2B, 2C or 2D or the video camera 3 (or the video adaptor or the camera adaptor) identifies the connection partner, which is the videotape recorder 2A, 2B, 2C or 2D or the video camera 3 (or the video adaptor or the camera adaptor), in accordance with a predetermined voltage level of the voltage signal taken in from the connection partner.

Since the function to be used and the type of signals to be exchanged vary depending on the connection partner, the videotape recorders 2A through 2D, the video camera 3 (and a video adaptor and a camera adaptor) defines the functional assignments of the remaining ones of the second and fourth terminals 14K through 14M and 19K through 19M of the first and second connectors 10 and 15 other than those that are used for the connection with the connection partner depending on the identified connection partner.

More specifically, if the connection partner is another one of the videotape recorders 2A through 2D or the video camera 3 (or a video adaptor), the one of the videotape recorders 2A through 2D or the video camera 3 (or a video adaptor or a camera adaptor) assigns the two second terminals 14K and 14L and the two fourth terminals 19K and 19L that are the eleventh and twelfth terminals of the first and second connectors 10 and 15 being used for the connection with the connection partner as counted from one of the opposite ends thereof to operate as spare transmission/reception terminals that can be assigned for transmission/reception of signals of some other type. Additionally, the one of the videotape recorders 2A through 2D or the video camera 3 (or a video adaptor or a camera adaptor) assigns the second terminal 14M and the fourth terminal 19M that are the thirteenth terminals of the first and second connectors 10 and 15 being used for the connection with the connection partner as counted from one of the opposite ends thereof to operate as synchronizing signal transmission terminals for transmitting/receiving synchronizing signals of video data of 24 frames per second.

If, on the other hand, the connection partner is a camera adaptor (or the video camera 3), the video camera 3 (or the camera adaptor) assigns the second terminal 14K and the corresponding fourth terminal 19K that are the eleventh terminals of the first and second connectors 10 and 15 being used for the connection with the connection partner as counted from one of the opposite ends thereof to operate as identification information transmission terminals for identifying the data on the left (L) channel and the data on the right (R) channel, which data constitute audio data, and transmitting synchronizing signals of each channel from the camera adaptor to the video camera 3. Additionally, the video camera 3 (or the camera adaptor) assigns the second terminal 14L and the fourth terminal 19L that are the twelfth terminals of the first and second connectors 10 and 15 being used for the connection with the connection partner as counted from one of the opposite ends thereof to operate typically as synchronizing signal transmission terminals for transmitting synchronizing signals of audio data from the camera adaptor to the video camera 3. Still additionally, the video camera 3 (or the camera adaptor) assigns the second terminal 14M and the corresponding fourth terminal 19M that are the thirteenth terminals of the first and second connectors 10 and 15 being used for the connection with the connection partners as counted from one of the opposite ends thereof to operate typically as data transmission terminals for transmitting audio data from the camera adaptor to the video camera 3.

In this way, the videotape recorders 2A through 2D and the video camera 3 (or a video adaptor and a camera adaptor) transmit signals, effectively using the limited number of terminals depending on the function of the connection partner, by appropriately changing the assignments of the terminals of the first and second connectors 10 and 15 for signals to be transmitted.

Figure 6:
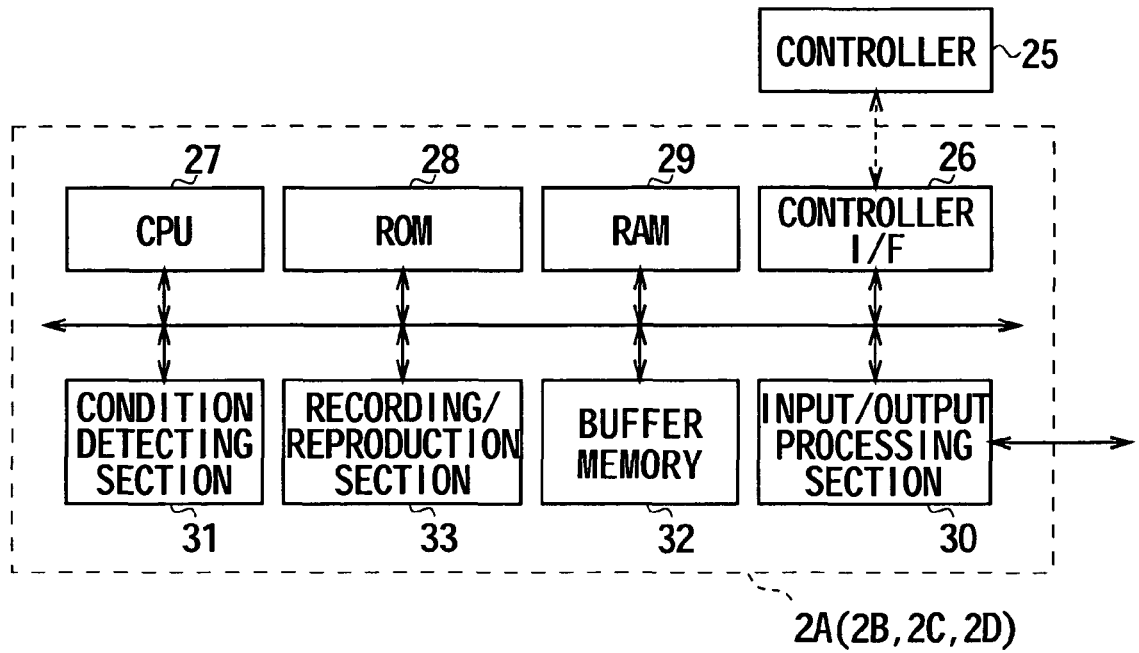
FIG. 6 is a schematic block diagram of a videotape recorder that can be used for the purpose of the present invention, showing the circuit configuration thereof.

As shown in FIG. 6, all the videotape recorder 2A through 2D can be connected to a controller 25 that can input various control instructions such as recording start instructions, recording end instructions. Such a controller 25 allows various control instructions to be input for the purpose of directly controlling any of the videotape recorders 2A through 2D connected to the controller 25 and also various control instructions to be input for the purpose of controlling the other videotape recorder or recorders 2A through 2D and/or the video camera 3 (and/or a video adaptor or a camera adaptor) connected to the former videotape recorder 2A, 2B, 2C or 2D.

When any of the videotape recorders 2A through 2D is connected to a controller 25, it operates as controller relative to the other videotape recorders 2A through 2D and the video camera 3 (and a video adaptor and a camera adaptor) so that it develops any of various programs that central processing unit (CPU) 27 stores in read only memory (ROM) 28 in advance on random access memory (RAM) 29 and executes the any of various programs, comprehensively controlling the entire system according to various control instructions input to it from the controller 25 by way of controller interface 26.

The central processing unit 27 stores apparatus identification information that is specific to the own videotape recorder 2A, 2B, 2C or 2D and also different pieces of apparatus identification information that are respectively specific to all the other videotape recorders 2A through 2D and the video camera 3 (and a video adaptor and a camera adaptor) that constitute the recording/reproduction system 1 in the RAM 29 in advance.

As the central processing unit 27 detects that the own videotape recorder 2A, 2B, 2C or 2D is connected to the other videotape recorders 2A through 2D and the video camera 3 (or a video adaptor and a camera adaptor), it generates a connected apparatus confirmation request signal and transmits it the other videotape recorders 2A through 2D and the video camera 3 (and the video adaptor and the camera adaptor) by way of the apparatus connection interfaces 4A through 4D. Then, in response, the central processing unit 27 receives the apparatus identification information transmitted from each of the other videotape recorders 2A through 2D and the video camera 3 (or the video adaptor and the camera adaptor) by way of the apparatus connection interfaces 4A through 4D and the input/output processing section 30. As a result, the central processing unit 27 compares the received apparatus identification information and the corresponding apparatus identification information stored in the RAM 29 and determines if the apparatus connected to the own videotape recorder 2A, 2B, 2C or 2D is an authorized apparatus that is registered in advance or not. At this time, the central processing unit 27 circulates and transmits the connected apparatus confirmation request signal through all the videotape recorders 2A through 2D and the video camera 3 (and the video adaptor and the camera adaptor) that participate in building the system. Therefore, the central processing unit 27 receives all the pieces of apparatus identification information transmitted from all the videotape recorders 2A through 2D and the video camera 3 (and the video adaptor and the camera adaptor) that participate in building the system in response to the reception of the connected apparatus confirmation request signal by way of the input/output processing section 30 and determines if each of the videotape recorders 2A through 2D and the video camera 3 (and the video adaptor and the camera adaptor) is an authorized apparatus or not.

Additionally, the central processing unit 27 continuously detects the existence or nonexistence of any of various processes that have been executed or to be executed and the progress of the ongoing execution of a process in its own videotape recorder 2A, 2B, 2C or 2D as its own condition by means of operating condition detecting section 31 and stores information on the detected own condition in the RAM 29 so as to update the information already stored in it. The central processing unit 27 also generates a condition confirming signal for confirming the condition of each of the other videotape recorders 2A through 2D and the video camera 3 (and the video adaptor and the camera adaptor) and a condition notifying signal for notifying its own condition by adding its own apparatus identification information to the information indicating its own condition. Then, the central processing unit 27 transmits the condition confirming signal and the condition notifying signal of its own condition from the input/output processing section 30 to the other videotape recorders 2A through 2D and the video camera 3 (and the video adaptor and the camera adaptor) by way of the apparatus connection interfaces 4A through 4D.

In this way, the central processing unit 27 circulates and transmits the condition confirming signal and the condition notifying signal of its own condition through the own videotape recorder 2A, 2B, 2C or 2D and the other videotape recorders 2A through 2D and the video camera 3 (and the video adaptor and the camera adaptor) that are connected in series. Then, the central processing unit 27 has each of the other videotape recorders 2A through 2D and the video camera 3 (and the video adaptor and the camera adaptor) generate a condition notifying signal of notifying the most updated condition of its own in response to the reception of the condition confirming signal and circulate and transmit the generated condition notifying signal with the condition confirming signal.

As a result, the central processing unit 27 can confirm the condition of each of the videotape recorders 2A through 2D and the video camera 3 (and the video adaptor and the camera adaptor) connected in series and, at the same time, have each of the other videotape recorders 2A through 2D and the video camera 3 (and the video adaptor and the camera adaptor) confirm the condition of each of the all the remaining videotape recorders 2A through 2D, the video camera 3 (and the video adaptor and the camera adaptor).

Additionally, when some other apparatus (i.e., some other videotape recorders 2A through 2D, the video camera 3, the video adaptor or the camera adaptor) is specified as object of control and, at the same time, a control instruction is input to the specified apparatus, the central processing unit 27 generates a control signal by adding the apparatus identification information of the apparatus to be controlled (which is the confirmed apparatus identification information of the authorized apparatus) to the control instruction. Then, the central processing unit 27 transmits the control signal from the input/output processing section 30 to the apparatus to be controlled by way of the apparatus connection interfaces 4A through 4D.

On the other hand, if the controller 25 is not connected to the own video tape recorder 2A, 2B, 2C or 2C, the central processing unit 27 equally acquires apparatus identification information for all the videotape recorders 2A through 2D and the video camera 3 (and the video adaptor and the camera adaptor) that participate in building the system and determines if each of them is an authorized apparatus or not. Additionally, if the controller 25 is not connected to the own videotape recorder 2A, 2B, 2C or 2D and control signals are transmitted from some other one of the videotape recorders 2A through 2D by way of the apparatus connection interfaces 4A through 4D, the central processing unit 27 receives the control signals by way of the input/output processing section 30 and identifies the control signal addressed to itself among the received control signals on the basis of the apparatus identification information added to it. Then, the central processing unit 27 reads out various programs stored in advance in the ROM 28 according to the control signal addressed to itself and develops the various programs it reads out on the RAM 29 to execute various processes, comprehensively controlling the entire system according to the control signal.

For example, when the central processing unit 27 receives a recording start signal as control signal that is input to it directly from the controller 25 or indirectly by way of the other videotape recorders 2A through 2D, the video camera 3 (and the video adaptor and the camera adaptor), it receives the video/audio data transmitted from the other videotape recorders 2A through 2D, the video camera 3 and so on by way of the input/output processing section 30 and transmits the received video/audio data to recording/reproduction section 33 by way of buffer memory 32. Then, the central processing unit 27 records the video/audio data on videotape by means of the recording/reproduction section 33. Note that the central processing unit 27 can record video/audio data right away according to the control signal and it also can temporarily store the video/audio data in the buffer memory 32 and execute a format transformation so as to reduce the number of frames per second before it stores video/audio data on videotape.

When, for example, the central processing unit 27 receives a reproduction start signal as control signal that is input to it directly or indirectly from the controller 25, it reproduces the specified video/audio data from videotape by means of the recording/reproduction section 33. Then, the central processing unit 27 newly processes the video/audio data to record them and transmits them to some other one of the videotape recorders 2A through 2D or the video adaptor that executes an output process for a monitor and a speaker from the input/output processing section 30 by way of the apparatus connection interfaces 4A through 4D.

Figure 7:
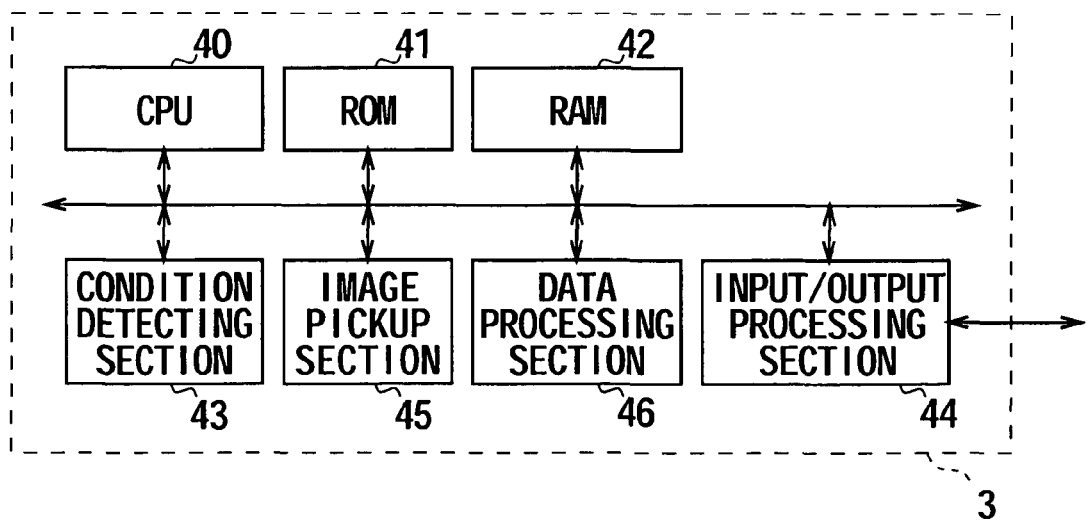
FIG. 7 is a schematic block diagram of a video camera that can be used for the purpose of the present invention, showing the circuit configuration thereof.

On the other hand, as shown in FIG. 7, the central processing unit 40 of the video camera 3 develops basic programs such as OS and various application programs which are stored in the ROM 41 in advance on the RAM 42 and executes various processes, comprehensively controlling the entire system according to the basic programs and the various application programs developed on the RAM 42. At this time, the central processing unit 40 receives all the pieces of apparatus identification information transmitted from all the videotape recorders 2A through 2D and the video camera 3 (and the video adaptor and the camera adaptor) that participate in building the system and determines if each of the videotape recorders 2A through 2D and the video camera 3 (and the video adaptor and the camera adaptor) is an authorized apparatus or not as in the case of the videotape recorders 2A through 2D. Additionally, the central processing unit 40 continuously detects the existence or nonexistence of any of various processes that have been executed or to be executed and the progress of the ongoing execution of a process in its own video camera 3 as its own condition by means of operating condition detecting section 43 and stores information on the detected own condition in the RAM 42 so as to update the information already stored in it. As the central processing unit 40 receives the condition confirming signal transmitted from one of the videotape recorders 2A through 2D that operates as controller by way of the apparatus connection interfaces 4A through 4D and the input/output processing section 44, it generates a condition notifying signal for notifying its own most updated condition according to the condition information stored in the RAM 42 in response. Then, the central processing unit 40 transmits the condition notifying signal from the input/output processing section 44 to the other videotape recorders 2A through 2D (or the video adaptor or the camera adaptor) by way of the apparatus connection interfaces 4A through 4D to notify its own condition.

Additionally, for example, when the central processing unit 40 receives an imaging start signal as control signal transmitted from one of the videotape recorders 2A through 2D that operates as controller by way of the apparatus connection interfaces 4A through 4D and the input/output processing section 44, it picks up an image of the subject by way of image pickup section 45 and transmits the obtained video data to data processing section 46. Then, the central processing unit 40 takes the audio data of the sounds picked up around the subject transmitted from the external camera adaptor into data processing section 46 way of the input/output processing section 44. Then, the central processing unit 40 synchronizes the video data and the audio data to produce video/audio data and transmits the video/audio data from the input/output processing section 44 to the videotape recorders 2A through 2D (or the video adaptor or the camera adaptor) by way of the apparatus connection interfaces 4A through 4D.

Now, transmission of a condition confirming signal and a condition notifying signal of the recording/reproduction system 1 will be described below by referring to FIGS. 8 and 9. Note that it is possible for the recording/reproduction system 1 to form either a common line in the videotape recorders 2A through 2D and the video camera 3 (and a video adaptor and a camera adaptor) that operates both as a signal transmission line for transmitting condition confirming signals (to be referred to as confirmation signal transmission line hereinafter) 50 and as a signal transmission line for transmitting condition notifying signals (to be referred to as notification signal transmission line hereinafter) 51 or separately a confirmation signal transmission line 50 and a notification signal transmission line 51. Therefore, a common line that operates both as a confirmation signal transmission line 50 and as a notification signal transmission line 51 will be described firstly below so as to be followed by a description of separately forming a confirmation signal transmission line 50 and a notification signal transmission line 51.

Figure 8:
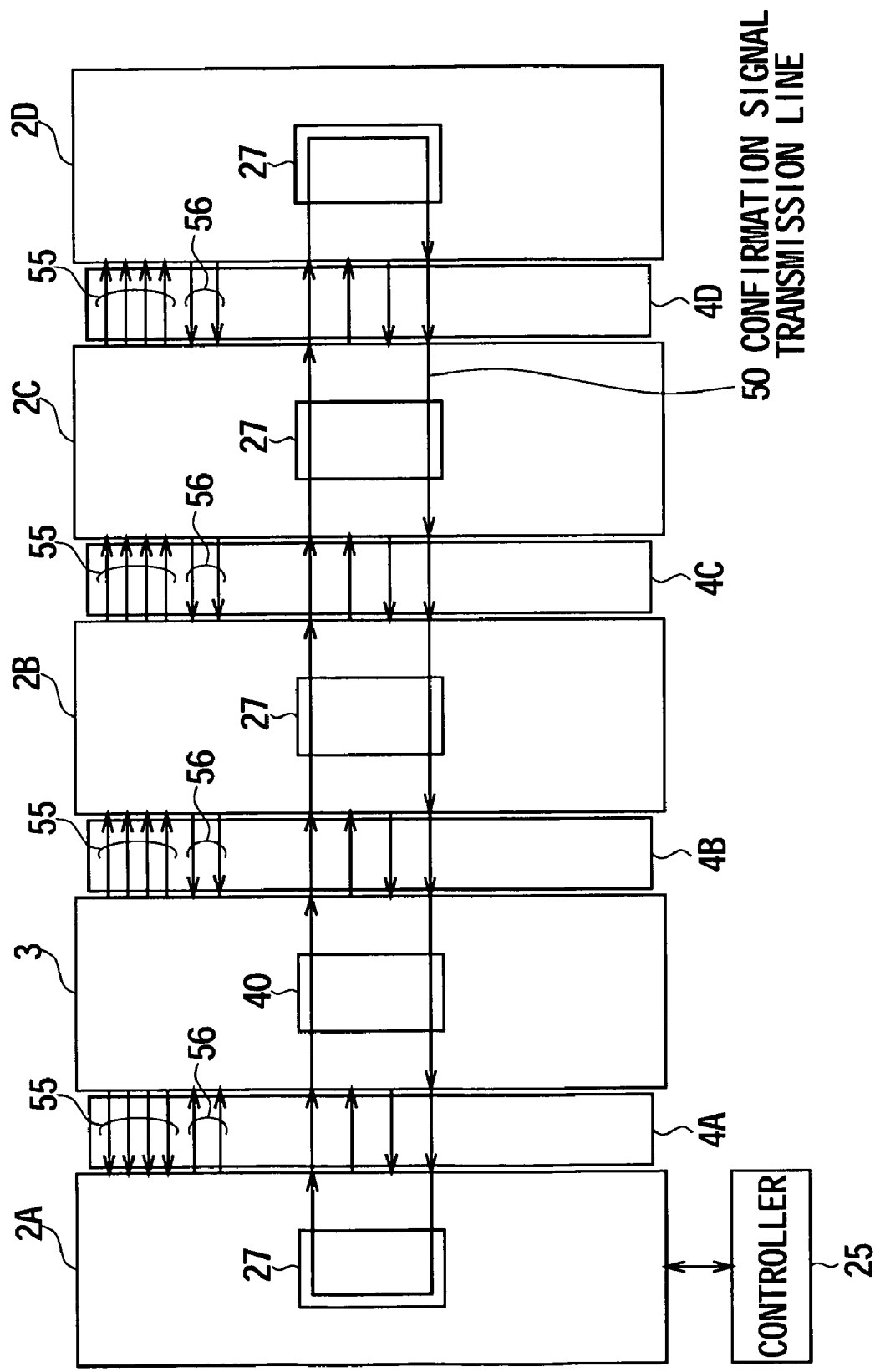
FIG. 8 is a schematic diagram illustrating transmission of a condition confirming signal and a condition notifying signal when a transmission line is shared for transmitting a confirming signal and for transmitting a notifying signal.

Referring to FIG. 8, when a common line that operates both as a confirmation signal transmission line 50 and as a notification signal transmission line 51 is defined and the videotape recorders 2A through 2D and the video camera 3 (and the video adaptor and the camera adaptor) are connected in series to build a recording/reproduction system 1, the videotape recorders 2A through 2D and the video camera 3 (and the video adaptor and the camera adaptor) form a first one direction signal transmission line that extends in the connection one direction by way of the first one direction signal transmission terminals of the first and second connectors 10 and 15 and also a first other direction signal transmission line that extends in the connection other direction by way of the first other direction signal transmission terminals of the first and second connectors 10 and 15. Then, the central processing unit 27 of the videotape recorder 2A, which is the connection starting extremity among the videotape recorders 2A through 2D and the video camera 3, apparently connects the first other direction signal transmission line to the first one direction signal transmission line by way of an internal process. Similarly, the central processing unit 27 of the videotape recorder 2D, which is the connection ending extremity, apparently connects the first one direction signal transmission line to the first other direction signal transmission line by way of an internal process. In this way, the videotape recorders 2A through 2D and the video camera 3 (and the video adaptor and the camera adaptor) set up a common annular line that operates both as a confirmation signal transmission line 50 and as a notification signal transmission line 51.

Note that, in actuality, the videotape recorders 2A through 2D and the video camera 3 (and the video adaptor and the camera adaptor) form a first one direction signal transmission line, which is a balanced transmission path, by way of the paired first one direction signal transmission terminals of each of the first and second connectors and also a first other direction signal transmission line, which is a balanced transmission path, by way of the paired first other direction signal transmission terminals of each of the first and second connectors so as to set up a confirmation signal transmission line 50 that is a balanced transmission path formed by the first one direction signal transmission line and the first other direction signal transmission line. However, the paired first one direction signal transmission terminals are designed to transmit a condition confirming signal by way of the paired balanced transmission paths so as to operate as a scheme for detecting the value of the condition confirming signal without being influenced by common mode noises and transmit a condition notifying signal by way of the paired balanced transmission paths so as to operate as a scheme for detecting the value of the condition notifying signal without being influenced by common mode noises and therefore they can be apparently regarded as a single terminal. Similarly, the paired first other direction signal transmission terminals are designed to transmit a condition confirming signal by way of the paired balanced transmission paths so as to operate as a scheme for detecting the value of the condition confirming signal without being influenced by common mode noises and transmit a condition notifying signal by way of the paired balanced transmission paths so as to operate as a scheme for detecting the value of the condition notifying signal without being influenced by common mode noises and therefore they can be apparently regarded as a single terminal. Additionally, the confirmation signal transmission line 50 formed by a pair of balanced transmission paths is used as counter measure for common mode noises as described above. In other words, it does not transmit signals of different types at a same time. For the above described reason, the confirmation signal transmission line 50 is illustrated as an apparently single transmission line in FIG. 8.

In the above-described condition, for example, the central processing unit 27 of the videotape recorder 2A, to which the controller 25 is connected so that it operates as controller, circulates and transmits a condition confirming signal along with a condition notifying signal for notifying its own condition by way of the confirmation signal transmission line 50. Upon receiving the condition confirming signal transmitted by way of the confirmation signal transmission line 50, the central processing units 27 and 40 of the other videotape recorders 2B through 2D and the video camera 3 (and the video adaptor and the camera adaptor) generate respective condition notifying signals that show the most updated their own conditions and transmit them with the condition confirming signal to the downstream apparatus by way of the confirmation signal transmission line 50.

In this way, the central processing units 27 and 40 of the videotape recorders 2A through 2D and the video camera 3 (and the video adaptor and the camera adaptor) confirm the conditions of the videotape recorders 2A through 2D and the video camera 3 (and the video adaptor and the camera adaptor) other than themselves by means of the condition notifying signals that are circulated and transmitted. Additionally, each time the central processing units 27 and 40 of the videotape recorders 2A through 2D and the video camera 3 (and the video adaptor and the camera adaptor) receive a condition confirming signal, each of them compares the own condition it has notified of and the current own condition and, if they differ from each other, it generates a condition notifying signal that shows the most updated own condition and overwrites the condition notifying signal it is transmitting. In this way, each of the central processing units 27 and 40 of the videotape recorders 2A through 2D and the video camera 3 (and the video adaptor and the camera adaptor) can always notify the other central processing units 27 and 40 of the most updated own condition.

Then, when the central processing unit 27 of the videotape recorder 2A operates as controller, it also transmits various control signals including reproduction start signals and reproduction end signals by way of the confirmation signal transmission line 50. Thus, each time the central processing units 27 and 40 of the other videotape recorders 2B through 2D and the video camera 3 (and the video adaptor and the camera adaptor) receive a control signal of any type, each of the central processing units identifies the control signal addressed to it according to the apparatus identification information attached to the signal. Then, the central processing units 27 and 40 of the other videotape recorders 2B through 2D and the video camera 3 (and the video adaptor and the camera adaptor) respectively copy the control signals addressed to them, take them in and execute the corresponding processes, while they transmit the original control signals again through the confirmation signal transmission line 50 with response signals indicating the reception of the control signals.

As control signals are given to the central processing units 27 and 40 of the videotape recorders 2A through 2D and the video camera 3 (and the video adaptor and the camera adaptor) directly or indirectly by way of the controller 25, each of them performs any of various processes such as reproducing video/audio data from the corresponding videotape and transmitting the reproduced video/audio data by way of the first direction data transmission line 55 formed by using the first direction data transmission terminals of the first and second connectors 10 and 15 and/or by way of the second direction data transmission line 56 formed by using the second direction data transmission terminals of the first and second connectors 10 and 15.

The apparatus of the recording/reproduction system 1 cooperate to execute a process in a coordinated manner particularly when the videotape recorders 2A through 2D records the video/audio data obtained by shooting a subject by means of the video camera 3, when one of the videotape recorders 2A through 2D reproduces video/audio data and another one of the remaining videotape recorders 2A through 2D record the reproduced video/audio data and when the video camera 3 shoots a subject in order to record the obtained video/audio data on the videotape of one of the videotape recorders 2A through 2D. In such a case, the central processing unit 27 of any of the videotape recorders 2A through 2D or the central processing unit 40 of the video camera 3 (or that of the video adaptor or the camera adaptor) can constantly confirm the condition of the partner apparatus or each of the partner apparatus with which it cooperates by referring to the condition notifying signal received from the partner apparatus so that it may prepare for the process and execute it without delay, seeing the condition of the partner apparatus, or start the process accurately in an interlocked manner. Thus, it is not necessary for the central processing unit 27 of the videotape recorder 2A that operates as controller to constantly confirm the condition of each of the other videotape recorders 2B through 2D and the video camera 3 (and the video adaptor and the camera adaptor) and control them so as to have them execute respective processes at right timing in an optimal condition. In other words, if the central processing unit 27 of the videotape recorder 2A operates as controller, the processing load of the central processing unit 27 that operates as controller can be remarkably reduced because it is simply required to transmit control signal to the other videotape recorders 2B through 2D and the video camera 3 (and the video adaptor and the camera adaptor).

Additionally, when the central processing unit 27 of the videotape recorder 2A operates as controller and receives the condition confirming signal and the control signals of various different types it has transmitted by way of the confirmation signal transmission line 50, it can confirm at a time that the condition confirming signal and the control signals of various different types have been transmitted properly to the other videotape recorders 2B through 2D and the video camera 3 (and the video adaptor and the camera adaptor). Additionally, when the central processing unit 27 receives the condition notifying signals and the response signals transmitted to it by way of the confirmation signal transmission line 50, it can confirm at a time that the other videotape recorders 2B through 2D and the video camera 3 (and the video adaptor and the camera adaptor) have rightly received the condition confirming signal and the control signals of various different types. Since a single common line is used to operate both as a confirmation signal transmission line 50 and as a notification signal transmission line 51, the central processing unit 27 of the videotape recorder 2A that operates as controller can easily confirm that the other videotape recorders 2B through 2D and the video camera 3 (and the video adaptor and the camera adaptor) have properly received the control signals of various different types by means of a simple process of monitoring only a signal transmission line, which is the confirmation signal transmission line 50, without being required to constantly monitor a plurality of transmission lines connected respectively to a plurality of videotape recorders unlike control units in related art.

Figure 9:
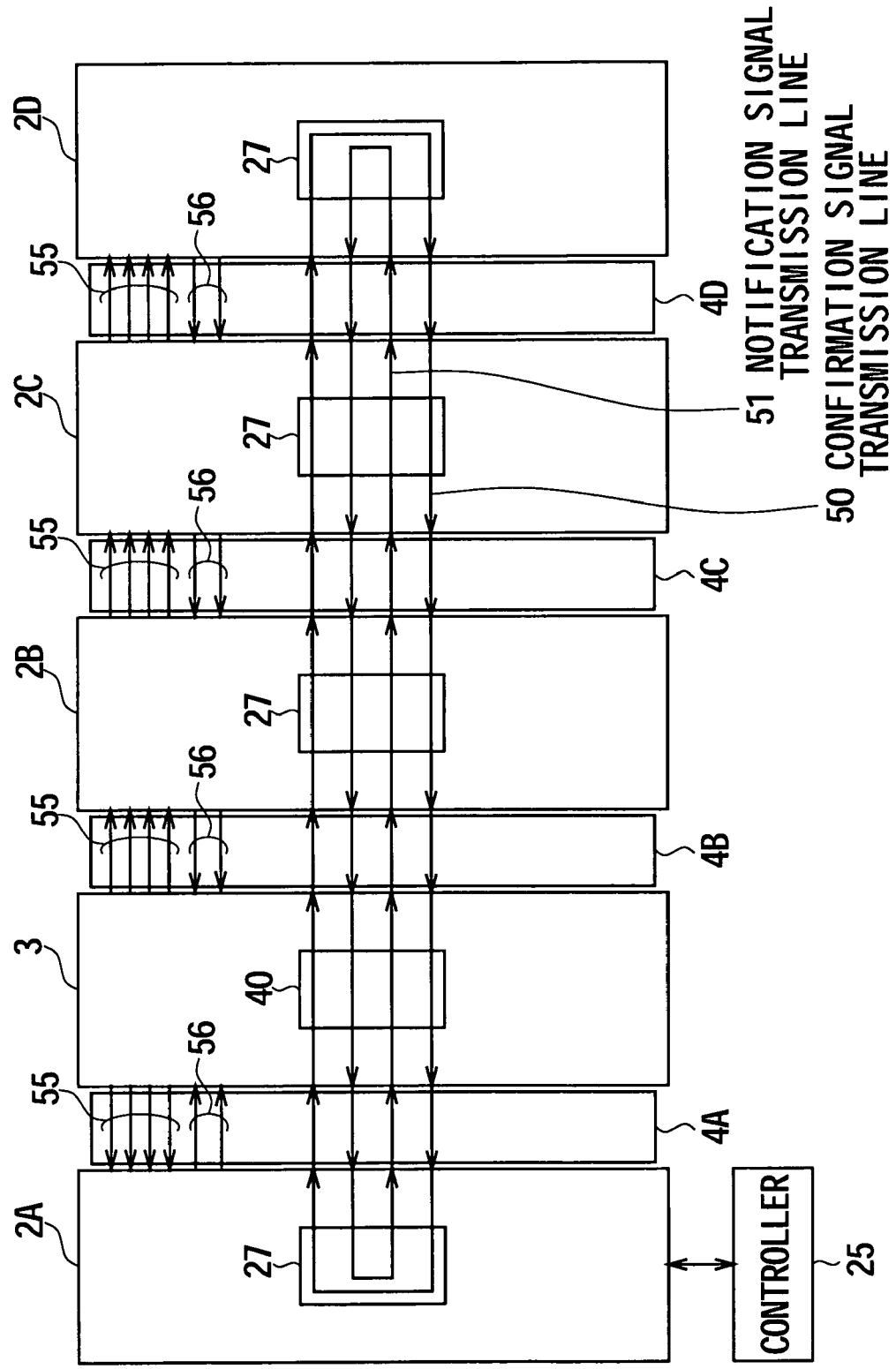
FIG. 9 is a schematic diagram illustrating transmission of a condition confirming signal and a condition notifying signal when a confirming signal transmission line and a notifying signal transmission line are formed separately.

Now referring to FIG. 9, when a confirmation signal transmission line 50 and a notification signal transmission line 51 are defined so as to be formed separately and the videotape recorders 2A through 2D and the video camera 3 (and the video adaptor and the camera adaptor) are connected in series to build a recording/reproduction system 1, the confirmation signal transmission line 50 is actually formed separately in a manner as described above by referring to FIG. 8. Additionally, the videotape recorders 2A through 2D and the video camera 3 (and the video adaptor and the camera adaptor) form a second one direction signal transmission line that extends in the connection one direction by way of the second one direction signal transmission terminals of the first and second connectors 10 and 15 and also a second other direction signal transmission line that extends in the connection other direction by way of the second other direction signal transmission terminals of the first and second connectors 10 and 15.

Then, the central processing unit 27 of the video tape recorder 2A, which is the connection starting extremity among the videotape recorders 2A through 2D and the video camera 3, apparently connects the second other direction signal transmission line to the second one direction signal transmission line by way of an internal process. Similarly, the central processing unit 27 of the videotape recorder 2D, which is the connection ending extremity, apparently connects the second one direction signal transmission line to the second other direction signal transmission line by way of an internal process. In this way, the videotape recorders 2A through 2D and the video camera 3 (and the video adaptor and the camera adaptor) separately set up an annular notification signal transmission line 51.

Note that, in actuality, the videotape recorders 2A through 2D and the video camera 3 (and the video adaptor and the camera adaptor) form a second one direction signal transmission line, which is a balanced transmission path, by way of the paired second one direction signal transmission terminals of each of the first and second connectors and also a second other direction signal transmission line, which is a balanced transmission path, by way of the paired second other direction signal transmission terminals of each of the first and second connectors so as to set up a notification signal transmission line 51 that is a balanced transmission path formed by the second one direction signal transmission line and the second other direction signal transmission line. However, the paired second one direction signal transmission terminals are designed to transmit a condition confirming signal by way of the paired balanced transmission paths so as to operate as a scheme for detecting the value of the condition confirming signal without being influenced by common mode noises and transmit a condition notifying signal by way of the paired balanced transmission paths so as to operate as a scheme for detecting the value of the condition notifying signal without being influenced by common mode noises and therefore they can be apparently regarded as a single terminal. Similarly, the paired second other direction signal transmission terminals are designed to transmit a condition confirming signal by way of the paired balanced transmission paths so as to operate as a scheme for detecting the value of the condition confirming signal without being influenced by common mode noises and transmit a condition notifying signal by way of the paired balanced transmission paths so as to operate as a scheme for detecting the value of the condition notifying signal without being influenced by common mode noises and therefore they can be apparently regarded as a single terminal. Additionally, the notification signal transmission line 51 formed by a pair of balanced transmission paths is used as counter measure for common mode noises as described above. In other words, it does not transmit signals of different types at a same time. For the above-described reason, the notification signal transmission line 51 is illustrated as an apparently single transmission line in FIG. 9.

In the above-described condition, for example, the central processing unit 27 of the videotape recorder 2A, to which the controller 25 is connected so that it operates as controller, circulates and transmits a condition confirming signal by way of the confirmation signal transmission line 50. Additionally, the central processing unit 27 also circulates and transmits the condition notifying signal for notifying its own condition in the direction opposite to the direction of circulating and transmitting the condition confirming signal by way of the notification signal transmission line 51. Upon receiving the condition confirming signal transmitted by way of the confirmation signal transmission line 50, the central processing units 27 and 40 of the other videotape recorders 2B through 2D and the video camera 3 (and the video adaptor and the camera adaptor) transmit the received condition confirming signal again by way of the confirmation signal transmission line 50. Additionally, in response to the reception of the condition confirming signal, the central processing units 27 and 40 of the other videotape recorders 2B through 2D and the video camera 3 (and the video adaptor and the camera adaptor) generate respective condition notifying signals that show the most updated their own conditions and transmit them in the direction opposite to the direction of circulation and transmission of the condition confirming signal by way of the notification signal transmission line 51.

In this way, the central processing units 27 and 40 of the videotape recorders 2A through 2D and the video camera 3 (and the video adaptor and the camera adaptor) confirm the conditions of the videotape recorders 2A through 2D and the video camera 3 (and the video adaptor and the camera adaptor) other than themselves by means of the condition notifying signals that are circulated and transmitted. Additionally, each time the central processing units 27 and 40 of the videotape recorders 2A through 2D and the video camera 3 (and the video adaptor and the camera adaptor) receive a condition confirming signal, each of them compares the own condition it has notified of and the current own condition and, if they differ from each other, it generates a condition notifying signal that shows the most updated own condition and overwrites the condition notifying signal it is transmitting. In this way, each of the central processing units 27 and 40 of the videotape recorders 2A through 2D and the video camera 3 (and the video adaptor and the camera adaptor) can always notify the other central processing units 27 and 40 of the most updated own condition.

Then, when the central processing unit 27 of the videotape recorder 2A operates as controller, it also transmits various control signals including reproduction start signals and reproduction end signals by way of the confirmation signal transmission line 50. Thus, each time the central processing units 27 and 40 of the other videotape recorders 2B through 2D and the video camera 3 (and the video adaptor and the camera adaptor) receive a control signal of any type, each of the central processing units identifies the control signal addressed to it according to the apparatus identification information attached to the signal. Then, the central processing units 27 and 40 of the other videotape recorders 2B through 2D and the video camera 3 (and the video adaptor and the camera adaptor) respectively copy the control signals addressed to them, take them in and execute the corresponding processes, while they transmit the original control signals again through the confirmation signal transmission line 50. Additionally, the central processing units 27 and 40 of the other videotape recorders 2B through 2D and the video camera 3 (and the video adaptor and the camera adaptor) transmit response signals indicating the reception of the control signals by way of the notification signal transmission line 51.

Thus, as a result, each of the central processing units 27 and 40 of the videotape recorders 2A through 2D and the video camera 3 (and the video adaptor and the camera adaptor) can constantly confirm the condition of the partner apparatus or each of the partner apparatus by referring to the condition notifying signal received from the partner apparatus so that it may prepare for the process and execute it without delay, seeing the condition of the partner apparatus, or start the process accurately in an interlocked manner as described above by referring to FIG. 8. Thus, it is not necessary for the central processing unit 27 of the videotape recorder 2A that operates as controller to constantly confirm the condition of each of the other videotape recorders 2B through 2D and the video camera 3 (and the video adaptor and the camera adaptor) and control them so as to have them execute respective processes at right timing in an optimal condition. In other words, if the central processing unit 27 of the videotape recorder 2A operates as controller, the processing load of the central processing unit 27 that operates as controller can be remarkably reduced because it is simply required to transmit control signal to the other videotape recorders 2B through 2D and the video camera 3 (and the video adaptor and the camera adaptor).

Additionally, as described above by referring to FIG. 8, when the central processing unit 27 of the videotape recorder 2A operates as controller and receives the condition confirming signal and the control signals of various different types it has transmitted by way of the confirmation signal transmission line 50, it can confirm at a time that the condition confirming signal and the control signal of various different types have been transmitted properly to the other videotape recorders 2B through 2D and the video camera 3 (and the video adaptor and the camera adaptor). Additionally, when the central processing unit 27 receives the condition notifying signals and the response signals transmitted to it by way of the notification signal transmission line 51, it can confirm at a time that the other videotape recorders 2B through 2D and the video camera 3 (and the video adaptor and the camera adaptor) have rightly received the condition confirming signal and the control signals of various different types. Still additionally, when the confirmation signal transmission line 50 and the notification signal transmission line 51 are formed separately in the recording/reproduction system 1, signals of different types can be classified and transmitted by way of the two transmission lines so that the load of signal transmission of the confirmation signal transmission line 50 can be remarkably reduced if compared with the use of a common line both as the confirmation signal transmission line 50 and as the notification signal transmission line 51 as described above by referring to FIG. 8.

Figure 10:
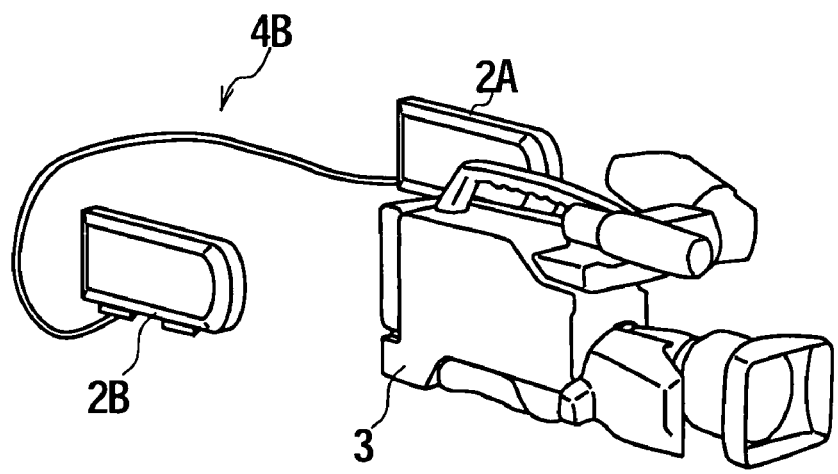
FIG. 10 is a schematic diagram illustrating how video/audio data are backed up.

Note that, in this embodiment, basically the videotape recorders 2A through 2D and the video camera 3 (and the video adaptor and the camera adaptor) are connected in series in the recording/reproduction system 1. Therefore, as shown in FIG. 10, if the two videotape recorders 2A and 2B are sequentially connected to the video camera 3 in series in the recording/reproduction system 1, the video/audio data that are obtained while the video camera 3 is shooting a subject can be sequentially transmitted to the first and second video tape recorders 2A and 2B by way of the apparatus connection interface 4B. Then, as a result, the video/audio data can be recorded substantially simultaneously on the two videotapes of the two videotape recorders 2A and 2B of the recording/reproduction system 1 so that one of the videotapes may be used as backup videotape.

Figure 11:
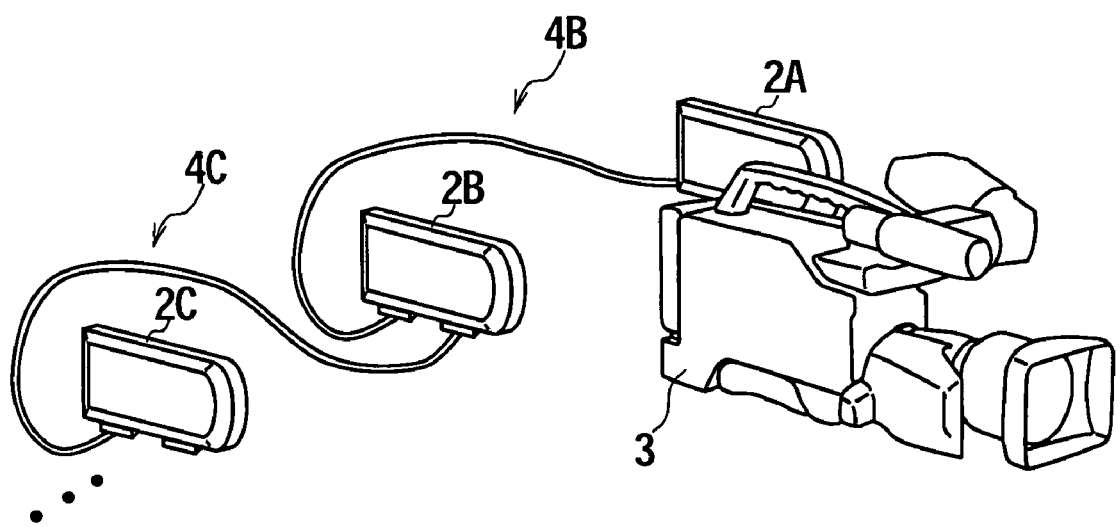
FIG. 11 is a schematic diagram illustrating how video/audio data are recorded for a long time.

Additionally, referring to FIG. 11, there may be occasions where an imaging operation continues for a long time as in the case of shooting and recording a concert by means of the video camera 3 and a plurality of (e.g., three) videotape recorders, or the videotape recorders 2A through 2C, that are sequentially connected in series in the recording/reproduction system 1. Then, the video/audio data obtained continuously from the video camera 3 are recorded by the three videotape recorders 2A through 2C in such a way that each of the videotape recorders 2A through 2C records video/audio data for a predetermined period of time so that consequently the entire video/audio data of the concert may completely be recorded by the three videotape recorders 2A through 2C if the imaging operation of the video camera 3 continues for a long time. Note that, with such an arrangement of the recording/reproduction system 1, a tail end part of the video/audio data recorded by one of the videotape recorders 2A through 2C may be overlapped with a leading part of the video/audio data recorded by another one of the videotape recorders 2A through 2C for purpose of security. Additionally, while one of the videotape recorders 2A through 2C of the recording/reproduction system 1 is recording video/audio data, the used videotapes of the other videotape recorders 2A through 2C can be replaced by blank ones to further prolong the recording time. It is also possible to prepare backup videotapes by combining the arrangement of FIG. 10 with that of FIG. 11.

Figure 12:
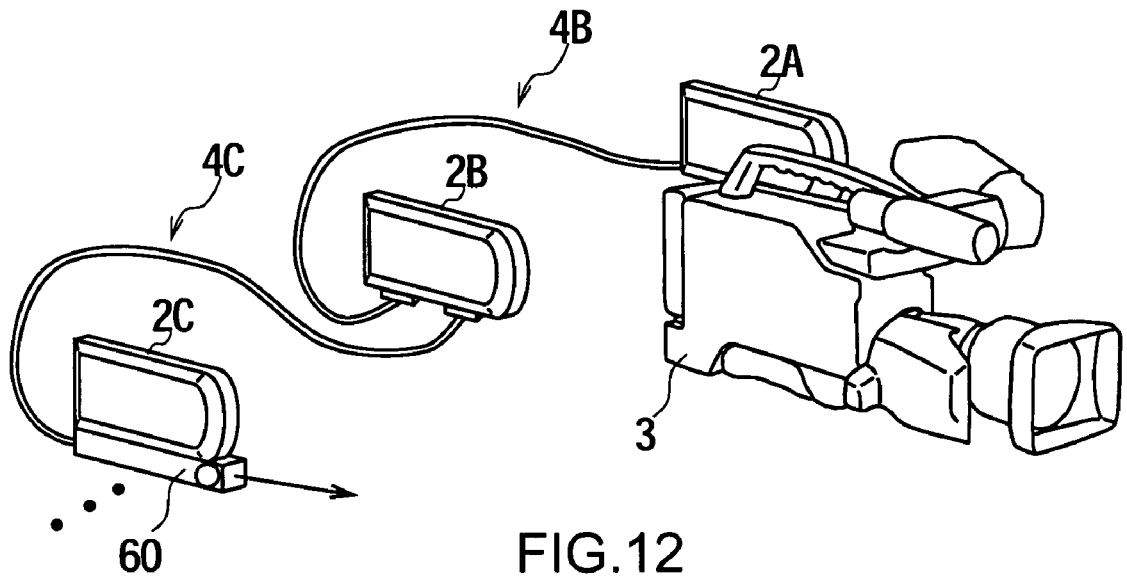
FIG. 12 is a schematic diagram illustrating how recorded video/audio data are confirmed while recording the video/audio data.

Additionally, FIG. 12 illustrates a possible arrangement of the recording/reproduction system 1 where a plurality of (e.g., three) videotape recorders 2A through 2C is connected sequentially to a video camera 3 in series and a video adaptor 60 is connected to the third videotape recorder 2C. With this arrangement, the first and second videotape recorders 2A and 2B can record the video/audio data obtained by the video camera 3 substantially simultaneously but the operation of recording video/audio data of the second videotape recorder 2B may be suspended on the way and switched to reproducing the recorded video/audio data and transmitting them to the third videotape recorder 2C. Then, with this arrangement of the recording/reproduction system 1, the video/audio data transmitted from the second videotape recorder 2B may be recorded in the third videotape recorder 2C and, at the same time, transmitted to a monitor and a speaker by way of the video adaptor 60 so that the operator may watch and check what has been picked up by the video camera 3 for confirmation. It is also possible with this arrangement of the recording/reproduction system 1 that the first and second videotape recorders 2A and 2B alternately record the video/audio data obtained by the video camera 3 so that the second videotape recorder 2B may reproduce the video/audio data that have been recorded while the first videotape recorder 2A is recording the video/audio data coming from the video camera 3 and the video/audio data reproduced by the second videotape recorder 2B may be recorded in the third videotape recorder 3C and, at the same time, transmitted to a monitor and a speaker by way of the video adaptor 60 so that the operator may watch and check what has been picked up by the video camera 3 for confirmation.

Figure 13:
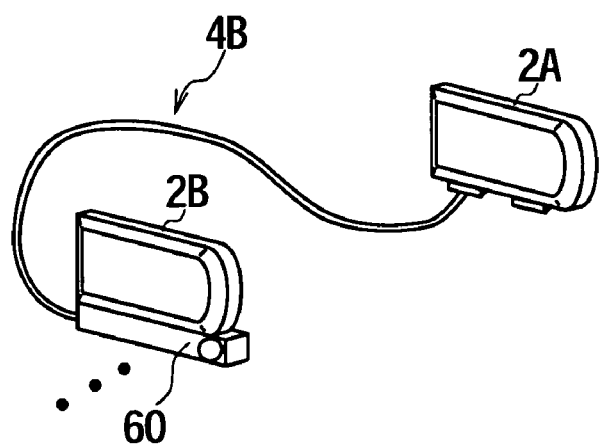
FIG. 13 is a schematic diagram illustrating how video/audio data are dubbed.

Still additionally, FIG. 13 illustrates another possible arrangement of the recording/reproduction system 1 where a plurality of (e.g., two) videotape recorders 2A and 2B is connected sequentially to a video camera 3 in series and a video adaptor 60 is connected to the second videotape recorder 2B. With this arrangement, the video/audio data already recorded in the first videotape recorder 2A may be reproduced and transmitted to and recorded in the second videotape recorder 2B for dubbing, while they are transmitted to a monitor and a speaker by way of the video adaptor 60 so that the operator may watch and check what has been picked up by the video camera 3 for confirmation. With this arrangement of the recording/reproduction system 1, the number of videotape recorders that are connected in series may be increased to produce copies of the video/audio data by the number of videotape recorders that are connected in series.

Figure 14:
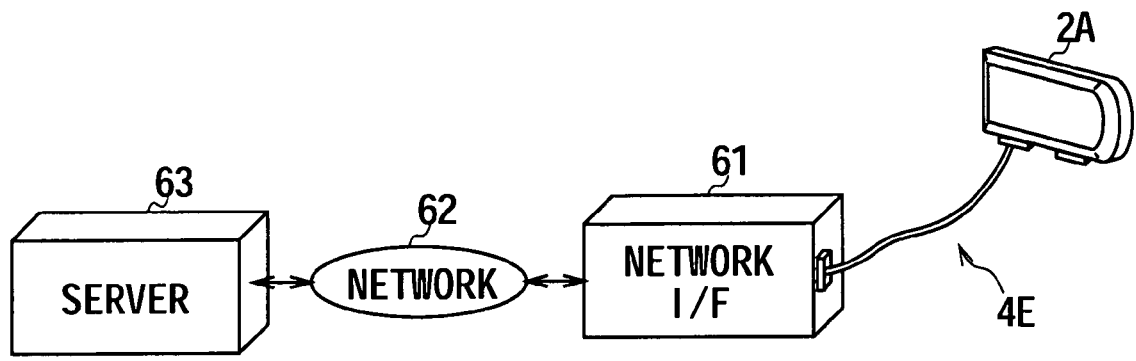
FIG. 14 is a schematic diagram illustrating how video/audio data are provided onto a network.

FIG. 14 illustrates still another possible arrangement of the recording/reproduction system 1 where the videotape recorder 2A is connected to a network interface 61 by way of the apparatus connection interface 4E and the network interface 61 is by turn connected to a server 63 by way of a network 62. With this arrangement, when an acquisition request is issued from the server 63 to the network interface 61 by way of the network 62, the network interface 61 takes in the video/audio data reproduced from the videotape recorder 2A and sends them to the server 63 by way of the network 62. Normally, the server 63 on the network 62 requests to divide the video/audio data and repeats an operation of issuing an acquisition request and acquiring a part of the video/audio data. In other words, as the videotape recorder 2A continuously reproduces the video/audio data, it temporarily stores the reproduced video/audio data in the buffer memory 32 to be used for recording and, each time it receives a request from the network interface 61, who has received an acquisition request from the server 63, to output video/audio data, it reads out the requested video/audio data from the buffer memory 32 and transmits them to the network interface 61. Thus, when the recording/reproduction system 1 receives a request for acquiring video/audio data, it repeats an operation of starting reproduction of video/audio data and ending the reproduction by means of the videotape recorder 2A so that it can provide the server 63 with the video/audio data smoothly without dividing the video/audio data. Then, the processing load of the videotape recorder 2A can be remarkably reduced.

Figure 15:
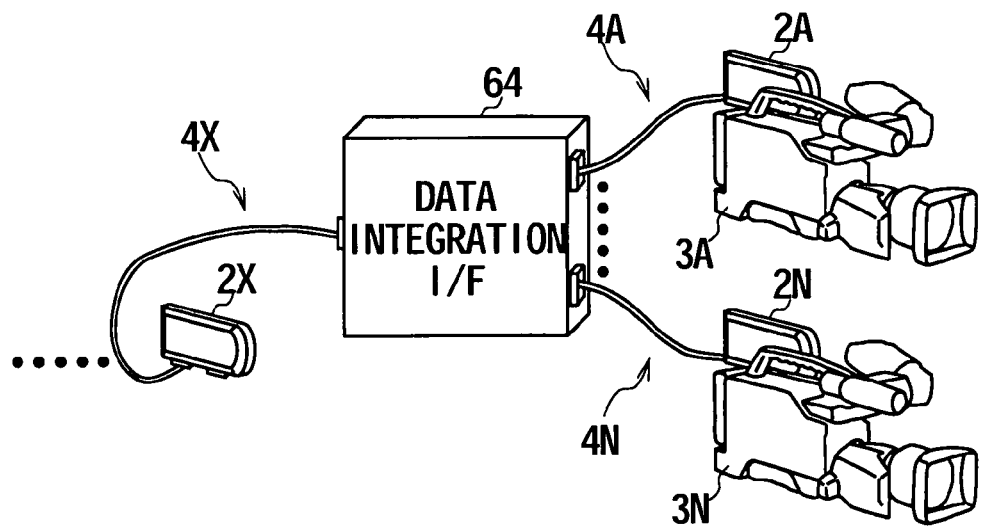
FIG. 15 is a schematic diagram illustrating how video/audio data are integrally recorded.

FIG. 15 illustrates still another possible arrangement of the recording/reproduction system 1 where a plurality of video cameras 3A, . . . , 3N are connected to the input side of a data integration interface 64 by way of respective videotape recorders 2A, . . . , 2N and respective interfaces 4A, . . . , 4N. Additionally, a videotape recorder 2X is connected to the output side of the data integration interface 64 by way of an apparatus connection interface 4X. With this arrangement, since a plurality of transmission lines is provided for video/audio data, it is possible to transmit the video/audio data obtained by the plurality of video cameras 3A, . . . , 3N to the data integration interface 64, while recording them in the corresponding videotape recorders 2A, . . . , 2N, so that the data integration interface 64 by turn may distribute the plurality of sets of video/audio data to a plurality of transmission lines and transmits and records them in the videotape recorder 2X. In this way, the recording/reproduction system 1 can record the video/audio data obtained by the plurality of video cameras 3A, . . . , 3N in the corresponding plurality of videotape recorders 2A . . . , 2N and, at the same time, collectively in the single videotape recorder 2X.

Figure 16:
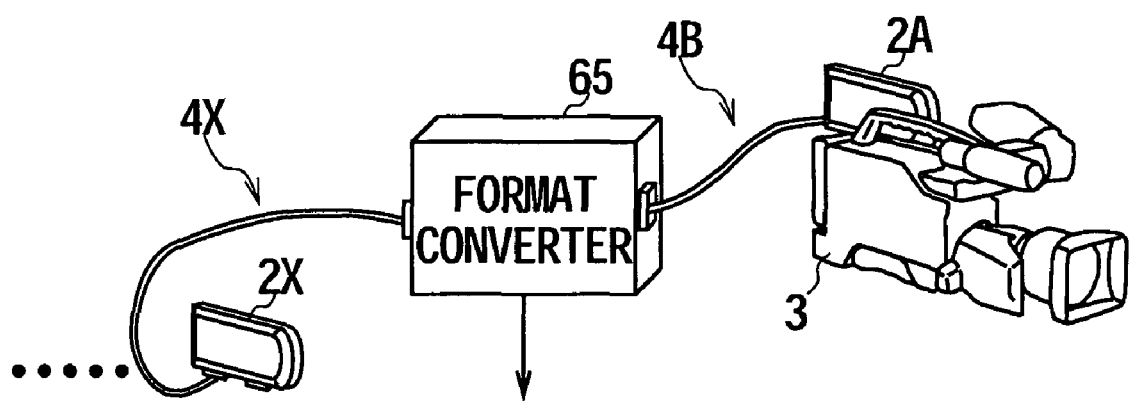
FIG. 16 is a schematic diagram illustrating how format conversion recording is applied to video/audio data.

FIG. 16 illustrates still another possible arrangement of the recording/reproduction system 1 where the video camera 3 is connected to the input side of a format converter 65 by way of the videotape recorder 2A and the apparatus connection interface 4B. Additionally, in the recording/reproduction system 1, another videotape recorder 2X is connected to the output side of the format converter 65 by way of an apparatus connection interface 4X. With this arrangement, the recording/reproduction system 1 can send out the video/audio data obtained by the video camera 3 to the format converter 65, while recording them in the videotape recorder 2A, and the format converter 65 by turn can convert the linear tone or the logarithmic tone of the images produced from the video/audio data into a logarithmic tone or a linear tone and records the video/audio data in the other videotape recorder 2X. In this way, it is possible to shoot a subject by means of the video camera 3 and at the same time record the obtained video/audio data in different formats substantially simultaneously.

In each of the above described possible arrangements of the recording/reproduction system 1, each of the first and second connectors 10 and 15 of each of the apparatus connection interfaces 4A through 4D for connecting the videotape recorders 2A through 2D and the video camera 3 sequentially in series is provided with a first one direction signal transmission terminal, a first other direction signal transmission terminal, a second one direction signal transmission terminal and a second other direction signal transmission terminal.

When a confirmation signal transmission line 50 is adapted to operate also as a notification signal transmission line 51 and the videotape recorder 2A through 2D and the video camera 3 are sequentially connected in series by way of the apparatus connection interfaces 4A through 4D in order to build the recording/reproduction system 1, an annular confirmation signal transmission line 50 is formed by way of the first one direction signal transmission terminals and the first other direction signal transmission terminals provided in the first and second connectors 10 and 15 of the apparatus connection interfaces 4A through 4D. Then, one of the videotape recorders 2A through 2D that is connected to a controller 25 operates as controller of the entire recording/reproduction system 1. Then, the videotape recorder 2A, 2B, 2C or 2D that operates as controller circulates and transmits a condition confirming signal for confirming the condition of each of the other videotape recorders 2A through 2D and the video camera 3 (and a video adaptor and a camera adaptor) to all the videotape recorder 2A through 2D and the video camera 3 (and the video adaptor and the camera adaptor) by way of the confirmation signal transmission line 50. Additionally, the videotape recorder 2A, 2B, 2C or 2D, whichever appropriate, that operates as controller circulates and transmits a condition notifying signal for notifying its own condition to the other videotape recorder 2A through 2D and the video camera 3 (and the video adaptor and the camera adaptor) to all the videotape recorder 2A through 2D and the video camera 3 (and the video adaptor and the camera adaptor) by way of the confirmation signal transmission line 50.

On the other hand, as the videotape recorder 2A through 2D and the video camera 3 (and the video adaptor and the camera adaptor) including the videotape recorder that operates as controller receive the condition confirming signal transmitted by way of the confirmation signal transmission line 50, each of them circulates and transmits a condition notifying signal for notifying its own condition to the other videotape recorder 2A through 2D and the video camera 3 (and the video adaptor and the camera adaptor) to all the videotape recorder 2A through 2D and the video camera 3 (and the video adaptor and the camera adaptor) in response by way of the confirmation signal transmission line 50. Additionally, each of the videotape recorder 2A through 2D and the video camera 3 (and the video adaptor and the camera adaptor) including the videotape recorder that operates as controller takes in the condition notifying signals transmitted from the videotape recorder 2A through 2D and the video camera 3 (and the video adaptor and the camera adaptor) other than itself. In this way, each time the videotape recorder 2A through 2D and the video camera 3 (and the video adaptor and the camera adaptor) receive a circulated and transmitted condition confirming signal, each of them updates its own condition notifying signal appropriately and transmits it. Thus, in the recording/reproduction system 1, it is possible for all the videotape recorder 2A through 2D and the video camera 3 (and the video adaptor and the camera adaptor) to confirm the conditions of the videotape recorder 2A through 2D and the video camera 3 (and the video adaptor and the camera adaptor).

When a confirmation signal transmission line 50 and a notification signal transmission line 51 are set up separately and the videotape recorder 2A through 2D and the video camera 3 are sequentially connected in series by way of the apparatus connection interfaces 4A through 4D in order to build the recording/reproduction system 1, an annular confirmation signal transmission line 50 is formed by way of the first one direction signal transmission terminals and the first other direction signal transmission terminals provided in the first and second connectors 10 and 15 of the apparatus connection interfaces 4A through 4D. Additionally, a notification signal transmission line 51 is formed by the videotape recorder 2A through 2D and the video camera 3 (and the video adaptor and the camera adaptor) by way of the second one direction signal transmission terminals and the second other direction signal transmission terminals provided in the first and second connectors 10 and 15 of the apparatus connection interfaces 4A through 4D. Then, the videotape recorder 2A, 2B, 2C or 2D that operates as controller circulates and transmits a condition confirming signal to all the videotape recorder 2A through 2D and the video camera 3 (and the video adaptor and the camera adaptor) by way of the confirmation signal transmission line 50. Additionally, the videotape recorder 2A, 2B, 2C or 2D, whichever appropriate, that operates as controller circulates and transmits a condition notifying signal to all the videotape recorder 2A through 2D and the video camera 3 (and the video adaptor and the camera adaptor) by way of the notification signal transmission line 51.

On the other hand, as the videotape recorder 2A through 2D and the video camera 3 (and the video adaptor and the camera adaptor) including the videotape recorder that operates as controller receive the condition confirming signal transmitted by way of the confirmation signal transmission line 50, each of them circulates and transmits a condition notifying signal to all the videotape recorder 2A through 2D and the video camera 3 (and the video adaptor and the camera adaptor) in response by way of the notification signal transmission line 51. Additionally, each of the videotape recorder 2A through 2D and the video camera 3 (and the video adaptor and the camera adaptor) including the videotape recorder that operates as controller takes in the condition notifying signals transmitted from the videotape recorder 2A through 2D and the video camera 3 (and the video adaptor and the camera adaptor) other than itself by way of the notification signal transmission line 51. In this way, each time the videotape recorder 2A through 2D and the video camera 3 (and the video adaptor and the camera adaptor) receive a circulated and transmitted condition confirming signal by way of the confirmation signal transmission line 50, each of them updates its own condition notifying signal appropriately and transmits it by way of the notification signal transmission line 51. Thus, in this case again, in the recording/reproduction system 1, it is possible for all the videotape recorder 2A through 2D and the video camera 3 (and the video adaptor and the camera adaptor) to confirm the conditions of the videotape recorder 2A through 2D and the video camera 3 (and the video adaptor and the camera adaptor).

Thus, it is not necessary for the videotape recorder 2A, 2B, 2C or 2D that operates as controller to constantly confirm the condition of each of the other videotape recorders 2A through 2D and the video camera 3 (and the video adaptor and the camera adaptor) and transmit control signals at right timing in the recording/reproduction system 1. In other words, the videotape recorder 2A, 2B, 2C or 2D that operates as controller is simply required to transmit control signals and the videotape recorders 2A through 2D and the video camera 3 (and the video adaptor and the camera adaptor) that are controlled can execute processes according to the control signals, confirming the conditions of the other videotape recorders 2A through 2D and the video camera 3 (and the video adaptor and the camera adaptor), in a manner that matches their conditions.

With the above-described arrangement, the first and second connectors 10 and 15 of the apparatus connection interfaces 4A through 4D are provided with one direction signal transmission terminals and other direction signal transmission terminals. Thus, when the videotape recorder 2A through 2D and the video camera 3 are sequentially connected in series by way of the apparatus connection interfaces 4A through 4D, an annular transmission line is set up by the terminals so that condition confirming signals are circulated and transmitted by way of the annular transmission line while condition notifying signals for respectively notifying the conditions of the videotape recorders 2A through 2D and the video camera 3 are also circulated and transmitted by way of the annular transmission line. Thus, in the recording/reproduction system 1, while the videotape recorders 2A through 2D and the video camera 3 that are other than the videotape recorder 2A, 2B, 2C or 2D that operates as controller receive control signals from the videotape recorder that operates as controller, they can be made to execute processes according to the control signals, mutually confirming their conditions in a manner that matches their conditions. As a result, when the plurality of videotape recorders 2A through 2D and the video camera 3 are used to build the recording/reproduction system 1, the apparatus connection interfaces 4A through 4D have the videotape recorder 2A, 2B, 2C or 2D that operates as controller confirm the conditions of the other videotape recorders 2A through 2D and the video camera 3 and transmit control signals at right timing to prevent in advance the processing load of controlling the system from remarkably increasing.

Thus, in this way, the apparatus connection interfaces can remarkably reduce the processing load of the videotape recorder 2A, 2B, 2C or 2D that operates as controller.

Furthermore, the first and second connectors 10 and 15 of the apparatus connection interfaces 4A through 4D may be provided with first one direction signal transmission terminals, first other direction signal transmission terminals, second one direction signal transmission terminals and second other direction signal transmission terminals so that an annular signal transmission line may be set by using any of the terminals. Thus, in the recording/reproduction system 1, a confirmation signal transmission line 50 can be formed by way of the first one direction signal transmission terminals and the first other direction signal transmission terminals so as to make it operate also as the notification signal transmission line 51. Then, it is possible to circulate and transmit a condition confirming signal and control signals of various different types as well as condition notifying signals and response signals by way of the confirmation signal transmission line 50. Thus, when the confirmation signal transmission line 50 is set up by using the apparatus connection interfaces 4A through 4D so as to operate also as the notification signal transmission line 51 in the recording/reproduction system 1, the video tape recorder 2A, 2B, 2C or 2D that operates as controller can easily and collectively confirm that the condition confirming signal and the control signals of various different types have been properly transmitted to the other videotape recorders 2A through 2D and the video camera 3 by means of a simple process of monitoring only the signals being transmitted by way of the single confirmation signal transmission line 50. Additionally, in the recording/reproduction system 1, the videotape recorder 2A, 2B, 2C or 2D that operates as controller can easily confirm that the condition confirming signal and the control signals of various different types have been properly received by the other videotape recorders 2A through 2D and the video camera 3 (and the video adaptor and the camera adaptor) by means of a simple process of monitoring only the signals being transmitted by way of the single confirmation signal transmission line 50.

Furthermore, in the recording/reproduction system 1, a confirmation signal transmission line 50 can be formed by way of the first one direction signal transmission terminals and the first other direction signal transmission terminals and separately a notification signal transmission line 51 can be formed by way of the second one direction signal transmission terminals and the second other direction signal transmission terminals so that a condition confirming signal and control signals of various different types may be circulated and transmitted by way of the confirmation signal transmission line 50, while condition notifying signals and response signals may be circulated and transmitted by way of the notification signal transmission line 51. Thus, when the confirmation signal transmission line 50 and the notification signal transmission line 51 are set up separately by using the apparatus connection interfaces 4A through 4D in the recording/reproduction system 1, the videotape recorder 2A, 2B, 2C or 2D that operates as controller can easily and collectively confirm that the condition confirming signal and the control signals of various different types have been properly transmitted to the other videotape recorders 2A through 2D and the video camera 3 by means of a simple process of monitoring only the signals being transmitted by way of the single confirmation signal transmission line 50. Additionally, in the recording/reproduction system 1, the videotape recorder 2A, 2B, 2C or 2D that operates as controller can easily confirm that the condition confirming signal and the control signals of various different types have been properly received by the other videotape recorders 2A through 2D and the video camera 3 (and the video adaptor and the camera adaptor) by means of a simple process of monitoring only the signals being transmitted by way of the single notification signal transmission line 51.

Moreover, in the recording/reproduction system 1, while the condition confirming signal and the control signals of various different types are transmitted by way of the confirmation signal transmission line 50 in one direction, the condition notifying signals and the response signals are transmitted by way of the notification signal transmission line 51 in the opposite direction. Therefore, in the recording/reproduction system 1, when the videotape recorders 2A through 2D other than the videotape recorder that operates as controller and the video camera 3 (and the video adaptor and the camera adaptor) receive the condition confirming signal and the control signals of various different types, the condition notifying signals and the response signals can be made to get to the videotape recorder 2A, 2B, 2C or 2D that operates as controller faster than the condition confirming signal and the control signals of various different types. Thus, the videotape recorder 2A, 2B, 2C or 2D that operates as controller can confirm that the condition confirming signal and the control signals of various different types have been properly received earlier when the confirmation signal transmission line 50 and the notification signal transmission line 51 are set up separately than when the confirmation signal transmission line 50 is made to operate also as the notification signal transmission line 51.

Furthermore, when the confirmation signal transmission line 50 and the notification signal transmission line 51 are set up separately in the recording/reproduction system 1, various signals are divided and transmitted by way of the two transmission lines so that it is possible to prevent in advance any unnecessary transmission delays from arising if signals to be transmitted by one of the transmission lines increase relative to the arrangement where the confirmation signal transmission line 50 is made to operate also as the notification signal transmission line 51.

Additionally, the first and second connectors 10 and 15 of the apparatus connection interfaces 4A through 4D are intensively provided with the first and second one direction signal transmission terminals and the first and second other direction signal transmission terminals as well as with the first direction data transmission terminals and the second direction data transmission terminals and the transmission lines for transmitting control signals of various different type and video/audio data are made to show an equal length. Thus, in the recording/reproduction system 1, it is possible to synchronize and transmit control signals of various different types and video/audio data and define with ease the delays that can arise for control signals of various different types and video/audio data.

Still additionally, since the apparatus connection interfaces 4A through 4D are used to build a recording/reproduction system 1, the videotape recorders 2A through 2D and the video camera 3 (and the video adaptor and the camera adaptor) can be connected to build the recording/reproduction system 1 remarkably easily if compared with recording/reproduction systems in related art where videotape recorders 2A through 2D and a video camera 3 (and a video adaptor and a camera adaptor) are connected by way of connector cables for a control signal system and a video/audio data system that are separate systems.

Still additionally, the apparatus connection interfaces 4A through 4D allow the recording/reproduction system 1 to set up the confirmation signal transmission line 50 and the notification signal transmission line 51 so as to circulate and transmit condition confirming signals, condition notifying signals, control signals of various different types and response signals so that any of the videotape recorders 2A through 2D can be made to operate as controller simply by connecting a controller 25 to it. Thus, the system can be built much easier than any comparable system in related art.

It is so defined in advance that the confirmation signal transmission line 50 is set up to operate also as the notification signal transmission line 51 or the confirmation signal transmission line 50 and the notification signal transmission line 51 are set up separately when building the recording/reproduction system 1 in the above description. However, the present invention is by no means limited thereto and it may alternatively be so arranged that, when building the recording/reproduction system 1, it is so defined only that the confirmation signal transmission line 50 is set up to operate also as the notification signal transmission line 51 or only that the confirmation signal transmission line 50 and the notification signal transmission line 51 are set up separately. If the confirmation signal transmission line 50 is set up only to operate also as the notification signal transmission line 51 in the recording/reproduction system 1, the first and second connectors 10 and 15 can be formed without the pair of second one direction signal transmission terminals and the pair of second other direction signal transmission terminals to structurally simplify the first and second connectors 10 and 15.

While the first and second connectors 10 and 15 are provided respectively with first one direction signal transmission terminals and first other direction signal transmission terminals for transmitting condition confirming signals and control signals of various different types and also with second one direction signal transmission terminals and second other direction signal transmission terminals for transmitting condition notifying signals and response signals in the above described embodiment, the present invention by no means limited thereto and they may alternatively be provided with terminals for transmitting condition confirming signals and terminals for transmitting control signals of various different types and also with terminals for transmitting condition notifying signals and terminals for transmitting response signals.

While the video/audio data obtained from the video camera 3 of the recording/reproduction system 1 are recorded and reproduced in the above-described embodiment, the present invention is by no means limited thereto. It may alternatively be so arranged that the recording/reproduction system 1 records and reproduce various data including image data of photographs, program data and contents data such as text data.

While apparatus connection interfaces according to the invention are realized as the apparatus connection interfaces 4A through 4D that include first and second connectors 10 and 15 and connector cables in the above described embodiment, the present invention is by no means limited thereto. In other words, apparatus connection interfaces of various different configurations can be formed by applying the present invention. Such apparatus connection interfaces may include those that include only first and second connectors 10 and 15 so long as they can sequentially connect in series a plurality of apparatus to be controlled that can be controlled externally and includes recording/reproduction apparatus such as videotape recorders, hard disk recorders, and digital versatile disc (DVD) recorders, reproduction apparatus such as compact disc (CD) players and DVD players, game machines, television receiving sets, personal computers and printers.

The present invention can be applied to apparatus connection interfaces for connecting in series a plurality of apparatus to be controlled such as videotape recorders and DVD recorders.

The present invention can also be applied to apparatus control systems that are built by connecting in series a plurality of apparatus to be controlled such as videotape recorders and DVD recorders.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus connection interface comprising
an image capturing apparatus; and
a pair of connectors including a first connector and a second connector having respective signal transmission terminals for connecting a plurality of apparatus to be controlled and the image capturing apparatus in series to form an annular signal transmission line so as to circulate and transmit an operating condition confirming signal for confirming the condition of the apparatus to be controlled and the image capturing apparatus; and at the same time, circulate and transmit an operating condition notifying signal for notifying the condition of the individual apparatus to be controlled and the image capturing apparatus by way of the formed signal transmission line,
wherein the plurality of apparatus include a plurality of videotape recorders and the image capturing apparatus controls the plurality of videotape recorders through a plurality of the apparatus connection interfaces,
wherein each of the first and second connectors has a pair of one direction signal transmission terminals for sequentially transmitting the operating condition confirming signal and the operating condition notifying signal to the plurality of apparatus to be controlled connected in series in one direction directed from a connection starting extremity to a connection ending extremity and a pair of other direction signal transmission terminal for sequentially transmitting the operating condition confirming signal and the operating notifying signal to the plurality of apparatus to be controlled on the other direction directed from the connection ending extremity to the connection starting extremity in order to form a confirmation signal transmission line for circulating and transmitting the operating condition confirming signal and a notification signal transmission line for circulating and transmitting the operating condition notifying signal as the signal transmission line, and
wherein each of the first and second connectors has a pair of one direction signal transmission terminals and a pair of other direction signal transmission terminals as the signal, transmission terminals in order to separately form the confirmation signal transmission line and the notification signal transmission line that transmits the operating condition confirming signal and the operating condition notifying signal in opposite directions.

2. The apparatus connection interface according to claim 1, wherein each of the first and second connectors has data transmission terminals for sequentially transmitting contents data to the plurality of apparatus to be controlled in a predetermined first direction and a predetermined second direction.

3. An apparatus control system comprising:
an image capturing apparatus;
a plurality of apparatus to be controlled; and
a plurality of apparatus connection interfaces, each having a pair of connectors including a first connector and a second connector having respective signal transmission terminals, and each used for connecting the plurality of apparatus to be controlled and the image capturing apparatus in series, wherein the plurality of apparatus to be controlled and the image capturing apparatus being adapted to form an annular signal transmission line so as to circulate and transmit an operating condition confirming signal for confirming the condition of the apparatus to be controlled and the image capturing apparatus and, at the same time, circulate and transmit an operating condition notifying signal for notifying the condition of the individual apparatus to be controlled and the image capturing apparatus by way of the signal transmission line formed at the time of being connected in series by way of the apparatus connection interfaces, wherein the plurality of apparatus include a plurality of videotape recorders and the image capturing apparatus controls the plurality of videotape recorders through the plurality of apparatus connection interfaces, wherein each of the first and second connectors of each of the apparatus connection interfaces has as the signal transmission terminals a pair of one direction signal transmission terminals for sequentially transmitting the operating, condition confirming signal and the operating condition notifying signal to the plurality of apparatus to be controlled connected in series in one direction directed from a connection starting extremity to a connection ending extremity and a pair of other direction signal transmission terminal for sequentially transmitting the operating condition confirming signal and the operating condition notifying signal to the plurality of apparatus to be controlled on the other direction directed from the connection ending extremity to the connection starting extremity; and the plurality of apparatus to be controlled form a confirmation signal transmission line for circulating and transmitting the operating condition confirming signal and a notification signal transmission line for circulating and transmitting the operating condition notifying signal by means of the pair of one direction signal transmission terminals and the pair of other direction signal transmission terminals of the first and second connectors when connected in series by way of the plurality of apparatus connection interfaces in order to circulate and transmit the operating condition confirming signal by way of the formed confirmation signal transmission line and the operating condition notifying signal by way of the formed notification signal transmission line, and wherein the plurality of apparatus to be controlled form the confirmation signal transmission line and the notification signal transmission line by means of the pair of one direction signal transmission terminals and the pair of other direction signal transmission terminals of the first and second connectors at the time of being connected in series by way of the plurality of apparatus connection interfaces in order to circulate and transmit the operating condition confirming signal and the operating condition notifying signal in opposite directions relative to each other by way of the confirmation signal transmission line and the notification signal transmission line.

4. The system according to claim 3, wherein each of the first and second connectors of each of the apparatus connection interfaces has data transmission terminals for sequentially transmitting contents data to the apparatus to be controlled connected in series in a first predetermined direction and in a second predetermined direction; and the plurality of apparatus to be controlled form two data transmission lines by means of the data transmission terminals of the first and second connectors at the time of being connected in series by way of the plurality of apparatus connection interfaces in order to transmit the contents data in the first direction and in the second direction by way of the formed two data transmission lines.

5. A control method of controlling a control system for controlling apparatus, wherein the control system having an image capturing apparatus, a plurality of apparatus to be controlled, and a plurality of apparatus connection interfaces, each having a pair of connectors including a first connector and a second connector having respective signal transmission terminals, and each used for connecting the plurality of apparatus to be controlled and the image capturing apparatus in series; and the method includes a step of forming an annular signal transmission line by means of the signal transmission terminals of the first and second connectors at the time of connecting in series the plurality of apparatus to be controlled and the image capturing apparatus by way of the plurality of apparatus connection interfaces, a step of circulating and transmitting an operating condition confirming signal for confirming the condition of the apparatus to be controlled and the image capturing apparatus by way of the formed signal transmission line, and a step of circulating and transmitting an operating condition notifying signal for notifying the condition of the individual apparatus to be controlled and the image capturing apparatus, wherein the plurality of apparatus include a plurality of videotape recorders and the image capturing apparatus controls the plurality of videotape recorders through the plurality of apparatus connection interfaces, wherein each of the first and second connectors of each of the apparatus connection interfaces has as the signal transmission terminals a pair of one direction signal transmission terminals for sequentially transmitting the operating condition confirming, signal and the operating condition notifying signal to the plurality of apparatus to be controlled connected in series in one direction directed from a connection starting extremity to a connection ending extremity and a pair of other direction transmission terminal for sequentially transmitting the operating condition confirming signal and the operating condition notifying signal to the plurality of apparatus to be controlled on the other direction directed from the connection ending extremity to the connection starting extremity; and the plurality of apparatus to be controlled has a step of forming a confirmation signal transmission line for circulating and transmitting the operating condition confirming signal and a notification signal transmission line for circulating and transmitting the operating condition notifying signal by means of the pair of one direction signal transmission terminals and the pair of other direction signal transmission terminals of the first and second connectors when connected in series by way of the plurality of apparatus connection interfaces; and a step of circulating and transmitting the operating condition confirming signal by way of the formed confirmation signal transmission line and the operating condition notifying signal by way of the formed notification signal transmission line, and wherein the plurality of apparatus to be controlled form the confirmation signal transmission line and the notification signal transmission line by means of the pair of one direction signal transmission terminals and the pair of other direction signal transmission terminals of the first and second connectors at the time of being connected in series by way of the plurality of apparatus connection interfaces in order to circulate and transmit the operating condition confirming signal and the operating condition notifying signal in opposite directions relative to each other by way of the confirmation signal transmission line and the notification signal transmission line.

6. The method according to claim 5, wherein: each of the first and second connectors of each of the apparatus connection interfaces has data transmission terminals for sequentially transmitting contents data to the apparatus to be controlled connected in series in a first predetermined direction and in a second predetermined direction; and the plurality of apparatus to be controlled form two data transmission lines by means of the data transmission terminals of the first and second connectors at the time of being connected in series by way of the plurality of apparatus connection interfaces in order to transmit the contents data in the first direction and in the second direction by way of the formed two data transmission lines.

\* \* \* \* \*